United States Patent
Luo et al.

(10) Patent No.: US 10,952,090 B2
(45) Date of Patent: *Mar. 16, 2021

(54) SIGNAL MEASUREMENT METHOD, NETWORK SIDE DEVICE, AND USER EQUIPMENT

(71) Applicant: HUAWEI TECHNOLOGIES CO., LTD., Guangdong (CN)

(72) Inventors: Jun Luo, Kista (SE); Jin Liu, Shenzhen (CN); Pu Yuan, Shanghai (CN); Kelvin Kar Kin Au, Ottawa (CA); Mohammadhadi Baligh, Ottawa (CA); Amine Maaref, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,674

(22) Filed: May 22, 2019

(65) Prior Publication Data

US 2019/0274061 A1    Sep. 5, 2019

Related U.S. Application Data

(63) Continuation of application No. PCT/CN2018/071289, filed on Jan. 4, 2018.

(30) Foreign Application Priority Data

Jan. 5, 2017  (CN) .......................... 201710008490.3

(51) Int. Cl.
*H04W 4/00* (2018.01)
*H04W 24/10* (2009.01)
(Continued)

(52) U.S. Cl.
CPC .......... *H04W 24/10* (2013.01); *H04B 17/318* (2015.01); *H04L 5/00* (2013.01);
(Continued)

(58) Field of Classification Search
None
See application file for complete search history.

(56) References Cited

U.S. PATENT DOCUMENTS

| 8,724,596 B2 * | 5/2014 | Iwamura ............... H04W 36/30 370/332 |
| 9,749,075 B2 * | 8/2017 | Liao ..................... H04J 11/005 |

(Continued)

FOREIGN PATENT DOCUMENTS

| CN | 101931957 A | 12/2010 |
| CN | 103391629 A | 11/2013 |

(Continued)

OTHER PUBLICATIONS

Extended European Search Report issued in European Application No. 18736622.4 dated Aug. 6, 2019, 12 pages.

(Continued)

*Primary Examiner* — Phuongchau Ba Nguyen
(74) *Attorney, Agent, or Firm* — Fish & Richardson P.C.

(57) ABSTRACT

Embodiments of the present disclosure provide a signal measurement method, a network side device, and user equipment. The method includes the following steps: receiving, by user equipment, a channel state information-reference signal (CSI-RS); receiving, by the user equipment, a synchronization signal; and sending, by user equipment, a first measurement result and a second measurement result, wherein the first measurement result is obtained by measured the CSI-RS, and the second measurement result is obtained by measured the synchronization signal.

14 Claims, 12 Drawing Sheets

(51) Int. Cl.
*H04B 17/318* (2015.01)
*H04W 76/27* (2018.01)
*H04L 5/00* (2006.01)
*H04W 56/00* (2009.01)
*H04W 72/04* (2009.01)
*H04W 28/04* (2009.01)
*H04W 36/30* (2009.01)
*H04W 36/00* (2009.01)

(52) U.S. Cl.
CPC .......... *H04L 5/0051* (2013.01); *H04W 28/04* (2013.01); *H04W 36/30* (2013.01); *H04W 56/001* (2013.01); *H04W 72/04* (2013.01); *H04W 72/042* (2013.01); *H04W 72/046* (2013.01); *H04W 76/27* (2018.02); *H04W 36/00* (2013.01)

(56) References Cited

U.S. PATENT DOCUMENTS

| | | | |
|---|---|---|---|
| 10,050,756 B2* | 8/2018 | Park | H04L 25/0204 |
| 10,448,269 B2* | 10/2019 | Chai | H04W 24/08 |
| 2012/0190393 A1 | 7/2012 | Ishii et al. | |
| 2014/0044044 A1 | 2/2014 | Josiam et al. | |
| 2016/0044551 A1 | 2/2016 | Frenger et al. | |

FOREIGN PATENT DOCUMENTS

| | | |
|---|---|---|
| CN | 103716078 A | 4/2014 |
| EP | 2963965 A1 | 1/2016 |
| EP | 3393162 A1 | 10/2018 |
| WO | 2016093745 A1 | 6/2016 |

OTHER PUBLICATIONS

R1-1704190—Huawei et al., "DL L3 Mobility Procedure and RS Design," 3GPP TSG RAN WG1 Meeting #88bis, Spokane, USA, Apr. 3-7, 2017, 5 pages.

ETSI MCC, "R2-1700671 Report of 3GPP TSG RAN WG2 meeting #96 Reno, Nevada, USA, Nov. 14-18, 2016", Abstract, Presented at 3GPP TSG-RAN Working Group 2 meeting #97, Athens, Greece, Feb. 13-17, 2017, 231 pages.

PCT International Search Report and Written Opinion in International Application No. PCT/CN2018071289, dated Mar. 28, 2018, 13 pages (With English translation).

ZTE et al., "R2-167836Consideration on the RRM Measurement for NR", Abstract, Presented at 3GPP TSG-RAN WG2 Meeting #96, Reno, USA, Nov. 14-18, 2016, 6 pages.

* cited by examiner

| CSI-RS subframe parameter $I_{CSI-RS}$ | CSI-RS configuration period $T_{CSI-RS}$ (In a unit of a subframe) | CSI-RS subframe offset $\Delta_{CSI-RS}$ (In a unit of a subframe) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

SIGNAL MEASUREMENT METHOD, NETWORK SIDE DEVICE, AND USER EQUIPMENT

CROSS-REFERENCE TO RELATED APPLICATIONS

This application is a continuation of International Application No. PCT/CN2018/071289, filed on Jan. 4, 2018, which claims priority to Chinese Patent Application No. 201710008490.3, filed on Jan. 5, 2017. The disclosures of the aforementioned applications are hereby incorporated by reference in their entireties.

TECHNICAL FIELD

The present invention relates to the field of communications technologies, and specifically, to a signal measurement method, a network side device, and user equipment.

BACKGROUND

Radio resource management (Radio Resource Management, RRM) is to ensure service quality for a wireless user terminal in a network when a bandwidth is limited. A basic starting point is to flexibly allocate and dynamically adjust available resources for wireless transmission and the network when network traffic is distributed unevenly and a channel feature fluctuates with channel attenuation and interference, to improve wireless spectrum utilization to a greatest extent, avoid network congestion, and maintain signaling load as low as possible. The RRM includes power control, channel allocation, scheduling, handover, access control, load control, adaptive coding and modulation, and the like.

Currently, in a Long Term Evolution (Long Term Evolution, LTE) system, cell handover in the RRM uses a measurement manner that is based on a downlink signal. To be specific, a base station sends a reference signal (Reference signal, RS), for example, a common reference signal (Common Reference signal, CRS) of a fixed time-frequency resource; user equipment (User Equipment, UE) receives the CRS sent by the base station, obtains, through measurement, a measurement result such as reference signal received power (Reference Signal Received Power, RSRP) and reference signal received quality (Reference Signal Received Quality, RSRQ) of the CRS, and reports the measurement result to the base station; and the base station receives the measurement result fed back by the UE, and determines, based on the measurement result, whether the UE needs to perform cell handover.

In a communication process, the UE may be in a moving state, and may move from a center of a cell to an edge of the cell, or from an edge of a cell to a center of the cell. However, in these cases, the foregoing measurement manner is still used, a measurement signal cannot be configured for the UE as required due to the fixed measurement manner, and a ping-pong handover effect may be caused by insufficient measurement precision. In addition, the CRS exists in each downlink subframe sent by the base station. Consequently, this increases reference signal overheads to some extent for the base station, and affects measurement efficiency to some extent for the UE.

SUMMARY

Embodiments of the present invention provide a signal measurement method, a network side device, and user equipment, so as to configure a measurement signal as required, improve measurement precision and measurement efficiency, and reduce downlink reference signal overheads.

A first aspect of the embodiments of the present invention provides a signal measurement method, including:

sending, by a network side device, configuration information of a downlink reference signal, where the configuration information of the downlink reference signal is used to indicate air interface sending information of the downlink reference signal; and sending, by the network side device, the downlink reference signal, where the downlink reference signal is generated based on the configuration information of the downlink reference signal.

According to the first aspect of the embodiments of the present invention, the network side device delivers the configuration information that is used to indicate the air interface sending information of the downlink reference signal, and delivers the downlink reference signal to instruct the user equipment to perform measurement based on the downlink reference signal, so that a measurement signal can be configured as required, thereby improving measurement precision and measurement efficiency, and reducing downlink reference signal overheads.

In a possible implementation, the configuration information of the downlink reference signal includes port information of the downlink reference signal and time-frequency resource information of the downlink reference signal. The air interface sending information of the downlink reference signal is indicated by using the port information and the time-frequency resource information, so that the user equipment receives the downlink reference signal on a corresponding port and time-frequency resource.

In a possible implementation, the network side device sends the configuration information of the downlink reference signal over a physical broadcast channel PBCH. The network side device can send the configuration information of the downlink reference signal to all user equipments in coverage of the network side device over the PBCH, so that all the user equipments in the coverage can use the downlink reference signal for measurement.

In a possible implementation, the network side device sends the configuration information of the downlink reference signal by using radio resource control RRC signaling, in other words, pertinently sends the configuration information of the downlink reference signal. The configuration information of the downlink reference signal carried in the RRC signaling may vary for different user equipments.

In a possible implementation, the downlink reference signal is a configurable downlink reference signal, and includes a channel state information-reference signal or a downlink measurement reference signal. Use of the configurable downlink reference signal can reduce the downlink reference signal overheads.

In a possible implementation, the downlink reference signal is a beam-based downlink reference signal, and includes a beam-specific reference signal or a cell-specific reference signal.

In a possible implementation, when detecting that the user equipment is located in a preset edge area, the network side device sends the configuration information of the downlink reference signal. When the user equipment is located in the preset edge area, the downlink reference signal is used for measurement, so that the measurement precision can be improved, and a ping-pong handover effect is avoided.

In a possible implementation, when detecting that signal strength of the user equipment is less than a preset threshold, the network side device sends the configuration information of the downlink reference signal. When a signal is relatively poor, the downlink reference signal is used for measurement, so that the measurement precision can be improved, and a ping-pong handover effect is avoided.

In a possible implementation, the network side device receives a first measurement result sent by the user equipment, where the first measurement result is obtained by the user equipment through measurement based on the downlink reference signal, and includes at least one of first reference signal received power RSRP, first reference signal received quality RSRQ, or a first received signal strength indicator RSSI. The first measurement result has relatively high precision.

In a possible implementation, the network side device receives a second measurement result sent by the user equipment, where the second measurement result is obtained by the user equipment through measurement based on a synchronization signal sent by the network side device, and includes at least one of second RSRP, second RSRQ, or a second RSSI. The second measurement result is less precise than the first measurement result, and when a signal is relatively good, the user equipment may perform measurement based on the synchronization signal.

In a possible implementation, the network side device receives a third measurement result sent by the user equipment, where the third measurement result is obtained by the user equipment through calculation based on the first measurement result and the second measurement result, and includes at least one of third RSRP, third RSRQ, or a third RSSI. The third measurement result is more precise than the second measurement result.

In a possible implementation, the network side device receives the first measurement result and the second measurement result that are sent by the user equipment, where the first measurement result is obtained through measurement based on the downlink reference signal when the user equipment is located in the preset edge area, and the second measurement result is obtained through measurement based on the synchronization signal when the user equipment is located in a preset center area.

In a possible implementation, the network side device determines, based on a measurement result sent by the user equipment, whether the user equipment needs to perform cell handover or reselection, where the measurement result includes the first measurement result, or the second measurement result, or the third measurement result, or the first measurement result and the second measurement result; and if a determining result is that the user equipment needs to perform cell handover or reselection, the network side device sends an instruction message to the user equipment, where the instruction message is used to instruct the user equipment to perform cell handover or reselection.

In a possible implementation, the network side device sends a notification message, where the notification message includes configuration information of a downlink reference signal of a preset network side device. When moving to coverage of the preset network side device, the user equipment performs measurement based on the downlink reference signal of the preset network side device. This can improve measurement flexibility.

In a possible implementation, the network side device determines, based on the second measurement result, whether the user equipment is located in the preset edge area; when a determining result is that the user equipment needs to perform cell handover or reselection, sends configuration information of an uplink reference signal; receives the uplink reference signal sent by the user equipment; and performs measurement based on the uplink reference signal. The uplink reference signal is used for measurement to reduce latency and save power.

A second aspect of the embodiments of the present invention provides another signal measurement method, including:

receiving, by user equipment, configuration information of a downlink reference signal, where the configuration information of the downlink reference signal is used to indicate air interface sending information of the downlink reference signal;

receiving, by the user equipment, the downlink reference signal, where the downlink reference information is generated based on the configuration information of the downlink reference signal; and performing, by the user equipment, measurement based on the downlink reference signal.

In a possible implementation, precision of determining, by the network side device based on a second measurement result, or the first measurement result and the second measurement result, or the third measurement result, whether the user equipment needs to perform cell handover or reselection is relatively high.

According to the second aspect of the embodiments of the present invention, the user equipment performs measurement based on the downlink reference signal, so that measurement precision and efficiency can be improved.

In a possible implementation, the configuration information of the downlink reference signal includes port information of the downlink reference signal and time-frequency resource information of the downlink reference signal, and the user equipment receives the downlink reference signal on a corresponding port and time-frequency resource.

In a possible implementation, the configuration information of the downlink reference signal is sent to the user equipment over a PBCH or sent to the user equipment by using RRC signaling.

In a possible implementation, the downlink reference signal is a configurable downlink reference signal, and includes a channel state information-reference signal or a downlink measurement reference signal. Use of the configurable downlink reference signal can reduce downlink reference signal overheads.

In a possible implementation, the downlink reference signal is a beam-based downlink reference signal, and includes a beam-specific reference signal or a cell-specific reference signal.

In a possible implementation, the configuration information of the downlink reference signal is sent by the network side device to the user equipment when the network side device detects that the user equipment is located in a preset edge area.

In a possible implementation, the configuration information of the downlink reference signal is sent by the network side device to the user equipment when the network side device detects that signal strength of the user equipment is less than a preset threshold.

In a possible implementation, the user equipment obtains a first measurement result through measurement based on the downlink reference signal, and sends the first measurement result, where the first measurement result includes at least one of first RSRP, first RSRQ, or a first RSSI. The first measurement result has relatively high precision.

In a possible implementation, the user equipment obtains a second measurement result through measurement based on a synchronization signal. The second measurement result includes at least one of second RSRP, second RSRQ, or a second RSSI. The second measurement result is less precise than the first measurement result, and when a signal is relatively good, the user equipment may perform measurement based on the synchronization signal.

In a possible implementation, when the user equipment is located in a preset center area, the network side device obtains the second measurement result through measurement based on the synchronization signal.

In a possible implementation, the user equipment obtains a third measurement result through calculation based on the first measurement result and the second measurement result, and sends the third measurement result, and the network side device receives the third measurement result. The third measurement result includes at least one of third RSRP, third RSRQ, or a third RSSI. The third measurement result is more precise than the second measurement result.

In a possible implementation, the user equipment obtains the first measurement result through measurement based on the downlink reference signal when being located in the preset edge area, obtains the second measurement result through measurement based on the synchronization signal when being located in the preset center area, and sends the first measurement result and the second measurement result, and the network side device receives the first measurement result and the second measurement result.

In a possible implementation, the user equipment receives an instruction message, and performs cell handover or reselection according to the instruction message.

In a possible implementation, the user equipment receives a notification message, where the notification message includes configuration information of a downlink reference signal of a preset network side device; and if the user equipment is located in coverage of the preset network side device, the user equipment receives the downlink reference signal of the preset network side device, and performs measurement based on the downlink reference signal of the preset network side device, to improve measurement flexibility.

In a possible implementation, the user equipment receives configuration information of an uplink reference signal and sends the uplink reference signal.

A third aspect of the embodiments of the present invention provides a network side device, including a transceiver and a processor, where the transceiver is configured to send configuration information of a downlink reference signal to user equipment, where the configuration information of the downlink reference signal is used to indicate air interface sending information of the downlink reference signal; and the transceiver is further configured to send the downlink reference signal to the user equipment, where the downlink reference signal is generated based on the configuration information of the downlink reference signal and is used by the user equipment to perform measurement.

The network side device provided in the third aspect of the embodiments of the present invention is configured to implement functions performed by the network side device in the signal measurement method provided in the first aspect of the present invention. The functions may be implemented by using hardware, or may be implemented by executing corresponding software by hardware.

A fourth aspect of the embodiments of the present invention provides user equipment, including: a processor and a communications module, where the communications module is configured to receive configuration information that is of a downlink reference signal and that is sent by a network side device, where the configuration information of the downlink reference signal is used to indicate air interface sending information of the downlink reference signal;

the communications module is further configured to receive the downlink reference signal sent by the network side device, where the downlink reference information is generated based on the configuration information of the downlink reference signal; and the processor is configured to perform measurement based on the downlink reference signal.

The user equipment provided in the fourth aspect of the embodiments of the present invention is configured to implement functions performed by the user equipment in the signal measurement method provided in the second aspect of the present invention. The functions may be implemented by using hardware, or may be implemented by executing corresponding software by hardware.

A fifth aspect of the embodiments of the present invention provides a computer storage medium, configured to store a computer software instruction used by the network side device, where the computer software instruction includes a program designed to execute the foregoing aspects.

A sixth aspect of the embodiments of the present invention provides a computer storage medium, configured to store a computer software instruction used by the user equipment, where the computer software instruction includes a program designed to execute the foregoing aspects.

A seventh aspect of the embodiments of the present invention provides a communications system, and the system includes the network side device and the user equipment described in the foregoing aspects.

In the embodiments of the present invention, the network side device sends the configuration information of the downlink reference signal and the downlink reference signal, and the user equipment performs measurement based on the downlink reference signal, so that the measurement signal can be configured as required, thereby improving measurement precision and measurement efficiency, and reducing downlink reference signal overheads.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1A:
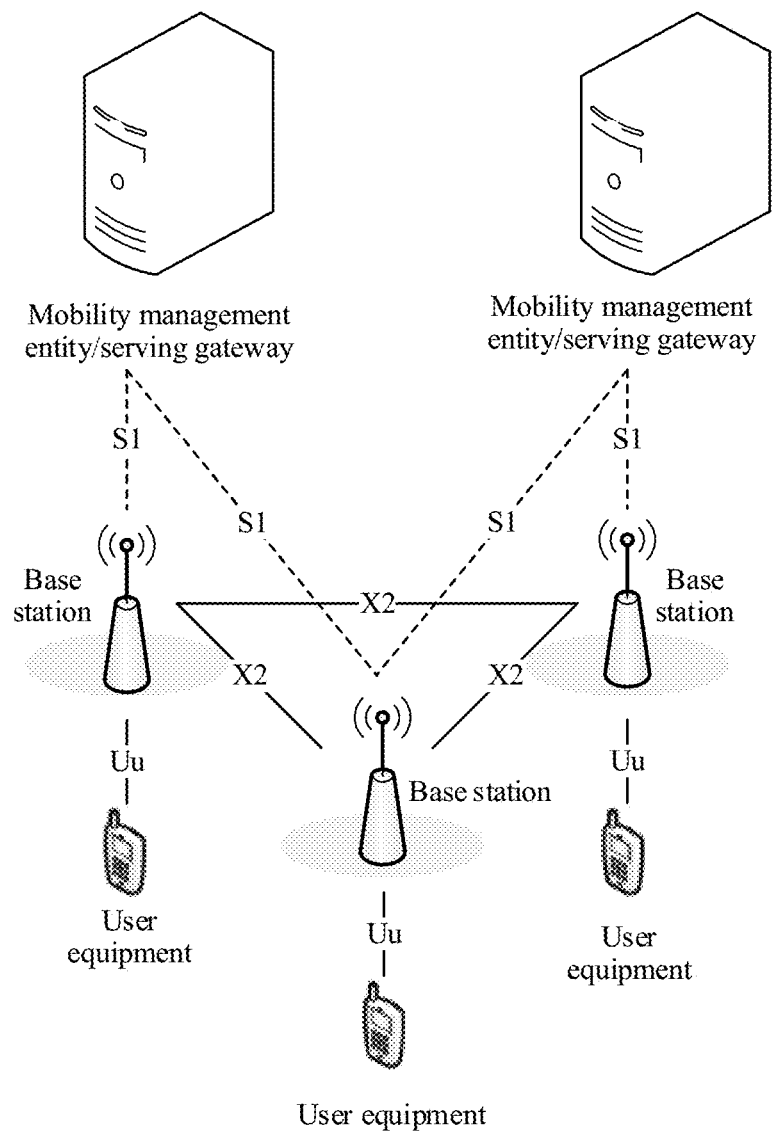
FIG. 1a is a schematic diagram of a network architecture applied to an embodiment of the present invention.

FIG. 1*a* is a schematic diagram of a network architecture applied to an embodiment of the present invention. The schematic diagram of the network architecture may be a network architecture of an LTE communications system, or may be a Universal Mobile Telecommunications System (Universal Mobile Telecommunications System, UMTS) terrestrial radio access network (UMTS Terrestrial Radio Access Network, UTRAN) architecture, a Global System for Mobile Communications (Global System for Mobile Communications, GSM)/Enhanced Data Rate for GSM Evolution (Enhanced Data Rate for GSM Evolution, EDGE) system radio access network (GSM EDGE Radio Access Network, GERAN) architecture, or even a fifth generation mobile communications (5th-Generation, 5G) system architecture. The schematic diagram of the network architecture includes a mobility management entity (Mobility Management Entity, MME)/serving gateway (Serving Gateway, S-GW), a base station, and user equipment (User Equipment, UE). It should be noted that, forms and quantities of MME/S-GWs, base stations, and UEs shown in FIG. 1*a* are used as examples for description, and do not constitute a limitation on the embodiments of the present invention.

The MME is a key control node in 3rd Generation Partnership Project (3GPP, 3rd Generation Partnership Project) LTE, is a core network element, and is mainly responsible for signaling processing, namely, a control plane function, including functions such as access control, mobility management, attachment and detachment, a session management, and gateway selection. The S-GW is an important core network elements in the 3GPP LTE, and is mainly responsible for a user plane function of user data forwarding, namely, packet routing and forwarding under control of the MME.

The base station is configured to communicate with the user equipment, and may be a base transceiver station (Base Transceiver Station, BTS) in a GSM system or Code Division Multiple Access (Code Division Multiple Access, CDMA), a NodeB (Node B, NB) in a WCDMA system, an evolved NodeB (eNB) in an LTE system, or even a base station in a 5G system or a base station in a future communications system. The base station is mainly responsible for radio resource management, quality of service (Quality Of Service, QoS) management, data compression and encryption, and other functions on an air interface side. On a core network side, the base station is mainly responsible for forwarding control plane signaling to the MME and forwarding user plane service data to the S-GW.

The user equipment is a device that accesses a network side by using the base station, and may include but is not limited to a cellular phone, a cordless telephone set, a Session Initiation Protocol (Session Initiation Protocol, SIP) phone, a wireless local loop (Wireless Local Loop, WLL) station, a personal digital assistant (Personal Digital Assistant, PDA), a handheld device or a computing device having a wireless communication function, another processing device connected to a wireless modem, an in-vehicle device, a wearable device, a terminal device in a future 5G network, or the like.

An S1 interface shown in FIG. 1*a* is a standard interface between the base station and a core network. The base station is connected to the MME through an S1-MME interface for control signaling transmission. The base station is connected to the S-GW through an S1-U interface for user data transmission. The S1-MME interface and the S1-U interface are collectively referred to as the S1 interface.

An X2 interface shown in FIG. 1*a* is a standard interface between base stations, and is configured to implement interworking between the base stations.

A Uu interface shown in FIG. 1*a* is a standard interface between the user equipment and the base station, and the user equipment accesses the LTE/5G network through the Uu interface.

Figure 1B:
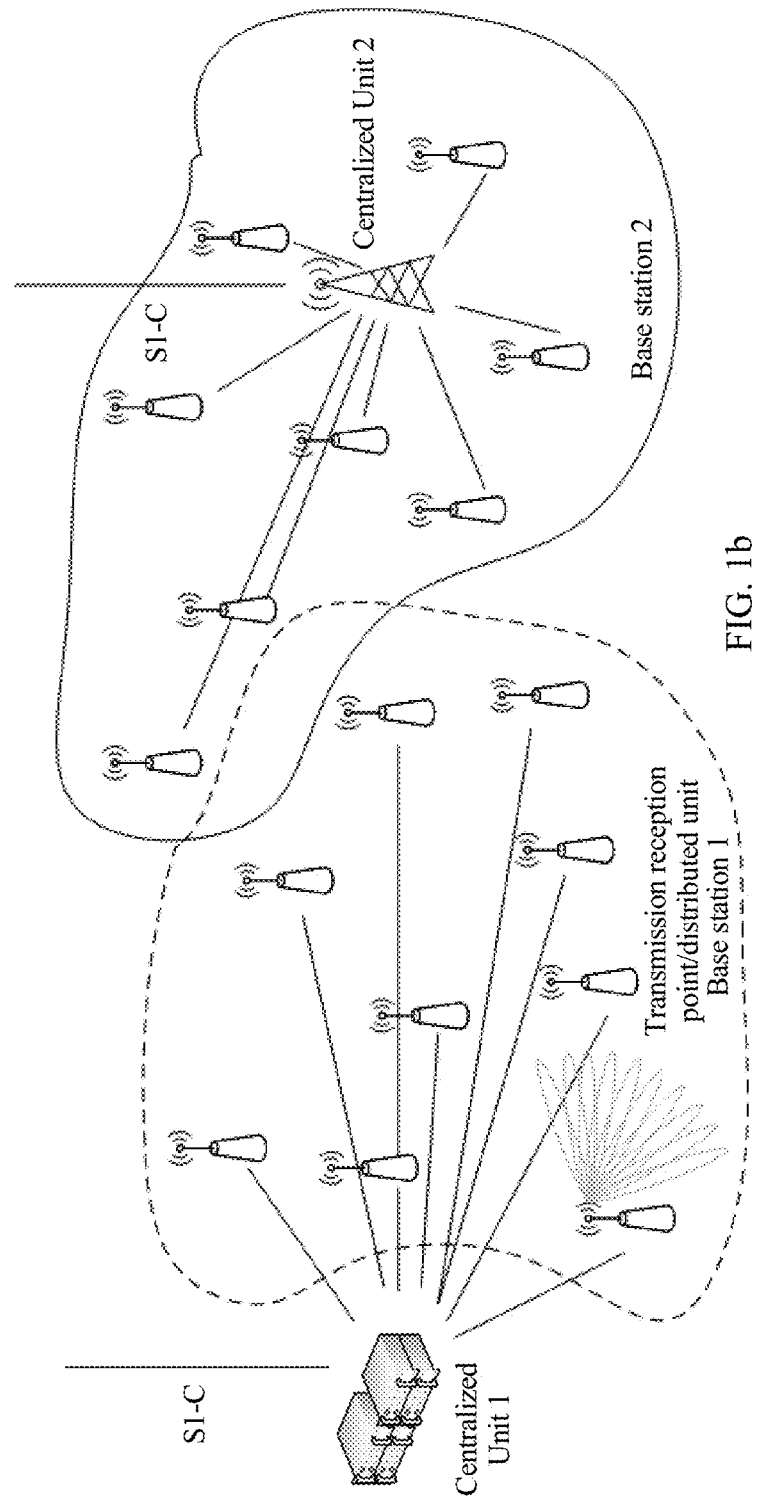
FIG. 1b is a schematic diagram of another network architecture applied to an embodiment of the present invention.

FIG. 1*b* is a schematic diagram of another network architecture applied to the embodiments of the present invention. The schematic diagram of the network architecture may be a network architectural diagram of new radio (New Radio, NR) in a next generation wireless communications system. In the schematic diagram of the network architecture, one base station is divided into one centralized unit (Centralized Unit, CU) and a plurality of transmission reception points (Transmission Reception Point, TRP)/distributed units (Distributed Unit, DU). In other words, a bandwidth based unit (Bandwidth Based Unit, BBU) of the base station is reconstructed as a DU functional entity and a CU functional entity. It should be noted that, forms and quantities of centralized units and TRP/DUs shown in FIG. 1*b* are used as examples for description, and do not constitute a limitation on the embodiments of the present invention. Although a base station 1 and a base station 2 shown in FIG. 1*b* are respectively corresponding to different forms of centralized units, functions of the base station 1 and the base station 2 are not affected. It may be understood that a centralized unit 1 and TRP/DUs within a dashed line range are composing elements of the base station 1, a centralized unit 2 and TRP/DUs within a solid line range are composing elements of the base station 2, and the base station 1 and the base station 2 are base stations in an NR system.

A CU processes a function of an upper radio protocol stack layer, for example, a radio resource control (Radio Resource Control, RRC) layer and a Packet Data Convergence Protocol (Packet Data Convergence Protocol, PDCP) layer, and can even support some core network functions in sinking to an access network. A term is referred to as an edge computing network. The access network can meet a higher network latency requirement of a future communications network for an emerging service such as video, online shopping, and virtual/augmented reality.

A DU mainly processes a physical layer function and a layer 2 function with a higher real-time requirement. Considering transmission resources of a radio remote unit (Radio Remote Unit, RRU) and the DU, some physical layer functions of the DU may be moved up to the RRU. With miniaturization of the RRU, a more radical DU may be combined with the RRU.

CUs can be laid together. A layout of DUs depends on an actual network environment. In an area with higher traffic density, a smaller inter-site distance, and limited equipment room resources, for example, a core urban area, a university, and large-scale performance venue, DUs may be laid in a centralized manner. However, in an area with lower traffic density and a larger inter-site distance, for example, a suburb and a mountainous area, DUs may be laid in a distributed manner.

An S1-C interface shown in FIG. 1b is a standard interface between a base station and a core network, and a specific device connected to the S1-C is not shown in FIG. 1b.

Based on the schematic diagram of the network architecture shown in FIG. 1a or FIG. 1b, an existing measurement manner based on a downlink signal includes: sending, by a base station or TRP, a CRS to UE; when receiving the CRS, obtaining, by the UE through measurement, a measurement result such as RSRP or RSRQ of the CRS, and reporting the measurement result to the base station or TRP; receiving, by the base station or TRP, the measurement result fed back by the UE; and performing, by the UE, cell handover based on the measurement result. This increases CRS overheads to some extent because the CRS exists in each downlink subframe. In addition, regardless of how the UE moves, a fixed signal measurement manner is used. Consequently, a measurement signal cannot be configured for the UE as required, a ping-pong handover effect may be caused due to insufficient measurement precision, and the measurement efficiency may also be affected to some extent.

In view of this, the embodiments of the present invention provide a signal measurement method, a network side device, and user equipment, and a configurable downlink reference signal is used for signal measurement, so that a measurement signal can be configured as required, thereby improving measurement precision and measurement efficiency. Because a configurable downlink reference signal exists only in some subframes, downlink reference signal overheads can be reduced.

The signal measurement method, the network side device, and the user equipment provided in the embodiments of the present invention may be applied to the schematic diagram of the network architecture shown in FIG. 1a or FIG. 1b. The network side device in the embodiments of the present invention may be the base station shown in FIG. 1a, or may be a TRP/DU shown in FIG. 1b, or may be a combination of a TRP/DU and a CU. The user equipment in the embodiments of the present invention may include but is not limited to a cellular phone, a cordless phone, a handheld device or a computing device having a wireless communication capability, another processing device connected to a wireless modem, an in-vehicle device, a wearable device, a terminal device in a future 5G network, or the like.

The following describes the signal measurement method provided in the embodiments of the present invention in detail with reference to FIG. 2 to FIG. 9B. It should be noted that FIG. 2 to FIG. 9B mainly describe the embodiments of the present invention from a perspective of interaction between the network side device and the user equipment. An example in which the network side device is a TRP is used for description.

Figure 2:
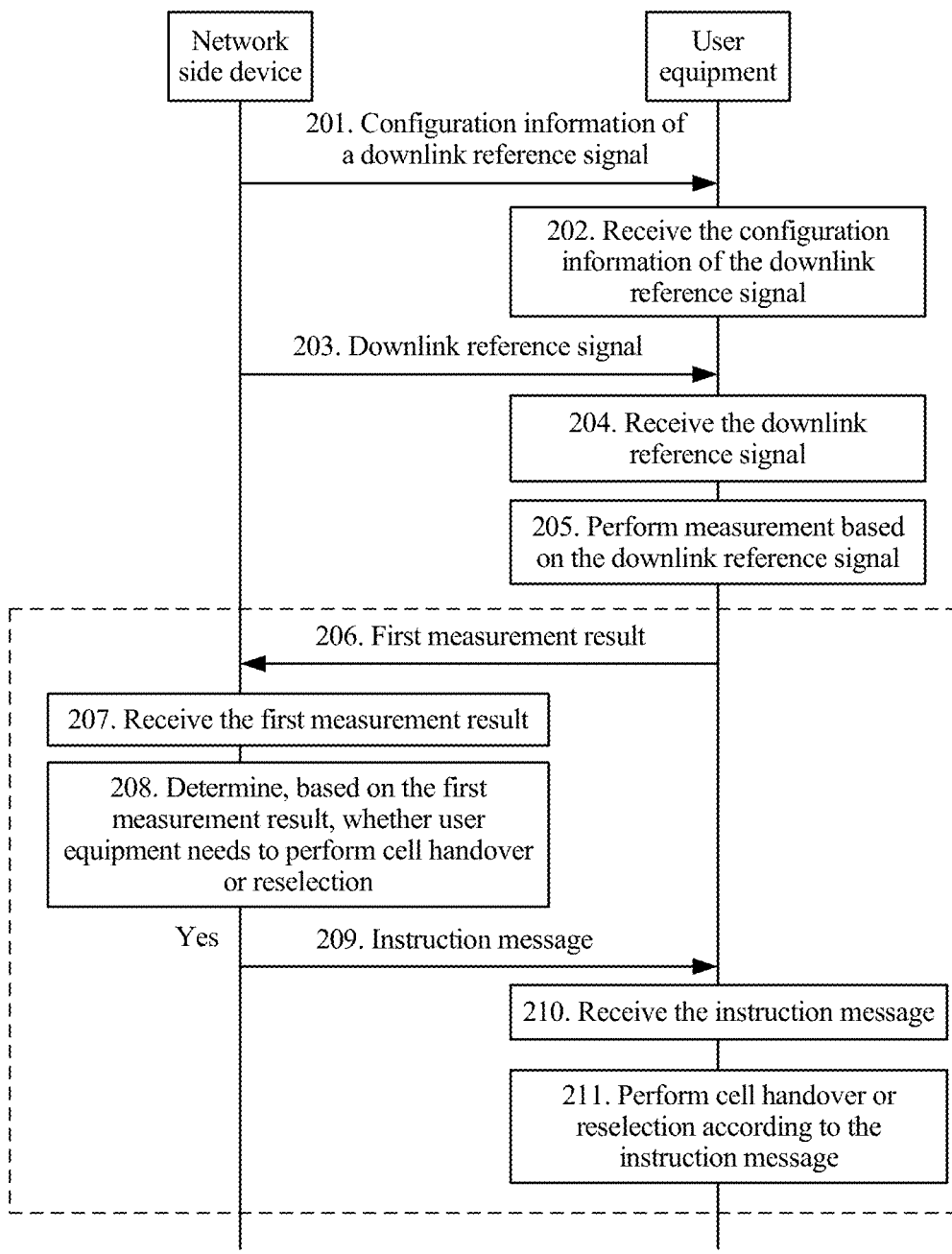
FIG. 2 is a schematic communication diagram of a signal measurement method according to Embodiment 1 of the present invention.

FIG. 2 is a schematic communication diagram of a signal measurement method according to Embodiment 1 of the present invention. The method includes step 201 to step 205.

201. A network side device sends configuration information of a downlink reference signal to user equipment, where the configuration information of the downlink reference signal is used to indicate air interface sending information of the downlink reference signal. In an LTE system, a CRS sent by a base station to user equipment exists in each downlink subframe, or in other words, the CRS always exists in downlink subframes, and this increases reference signal overheads to some extent. In view of this, in this embodiment of the present invention, the CRS that always exists in downlink subframes is not used for signal measurement, and a configurable downlink reference signal is used for signal measurement. In other words, the downlink reference signal in this embodiment of the present invention does not always exist in downlink subframes, and the downlink reference signal is configured in some subframes, or on some time-frequency resources or some ports. Specifically, a time-frequency resource location occupied by the downlink reference signal is configured by the network side device. It may be understood that the downlink reference signal in this embodiment of the present invention does not use the CRS in the LTE system, but uses the configurable downlink reference signal or a beam-based downlink reference signal.

It should be noted that the network side device configures more than one downlink reference signal, for example, configures different downlink reference signals for different cells, or configures different downlink reference signals or a same downlink reference signal for different beams of a same cell.

In a possible implementation, the downlink reference signal is the configurable downlink reference signal, and may be an existing configurable downlink reference signal in the LTE system, for example, a reference signal such as a channel state information-reference signal (Channel State Information-Reference Signal, CSI-RS), or may be a downlink measurement reference signal. The downlink measurement reference signal is a downlink reference signal provided in this embodiment of the present invention and is used to be distinguished from an existing downlink reference signal in the LTE system. In this embodiment of the present invention, when the downlink reference signal is configured by using the existing configurable downlink reference signal in the LTE system, the downlink reference signal may be configured on some ports (port) or some time-frequency resources of the existing downlink reference signal. To be specific, the existing downlink reference signal is reused to instruct the UE to perform measurement, but only some ports or some time-frequency resources of the existing downlink reference signal are used. For example, the CSI-RS can be configured by the network side device, to be specific, some subframes have the CSI-RS, and some subframes do not have the CSI-RS; and there is the CSI-RS sometimes, and there is no CSI-RS sometimes. In this embodiment of the present invention, the network side device may configure the downlink reference signal on some ports of the CSI-RS. It may be understood that the configurable downlink reference signal does not always exist in downlink subframes but exists only in some subframes, or on some time-frequency resources or some ports.

Optionally, for example, the downlink reference signal is a CSI-RS. If the UE is located in an overlapping area of a plurality of NR cells, the network side device may configure CSI-RS time-frequency resources of the plurality of NR cells for the UE. The CSI-RS time-frequency resources of the NR cells may be orthogonal, or may be the same. After the configuration, configuration information of the CSI-RS is obtained. The UE may measure the CSI-RS on the time-frequency resources of the different NR cells based on the configuration information of the CSI-RS.

In a possible implementation, the downlink reference signal is the beam-based downlink reference signal (Beam based RS), and may include a beam-specific reference signal (beam-specific RS), a cell-specific reference signal (cell-specific RS), or the like. In an NR system, one NR cell includes M TRPs, and each TRP includes N beams (beam). The beam-specific RS represents an RS that is based on a beam, and different RSs are used for different beams in different cells. The cell-specific RS represents an RS that is based on a cell, and a same RS is used for each beam of a same cell; or an RS for each cell has a same configuration.

It should be noted that the beam-based downlink reference signal is a semi-static downlink reference signal. To be specific, the network side device may configure the beam-based downlink reference signal, or may not configure the beam-based downlink reference signal, and the network side device specifically determines whether to configure the beam-based downlink reference signal. When not configure, the beam-based downlink reference signal always exists in downlink subframes, and overheads are still relatively high.

The network side device may configure the downlink reference signal in some subframes or on some time-frequency resources based on an actual situation, and after the configuration, obtain the configuration information of the downlink reference signal. The configuration information of the downlink reference signal is used to indicate the air interface sending information of the downlink reference signal, and includes port information of the downlink reference signal and time-frequency resource information of the downlink reference signal. The port information is used to describe a quantity of ports, such as 1, 2, 4, . . . , namely, a quantity of ports occupied for sending the downlink reference signal. The time-frequency resource information is used to describe a time-frequency resource location occupied for sending the downlink reference signal.

Figure 3:
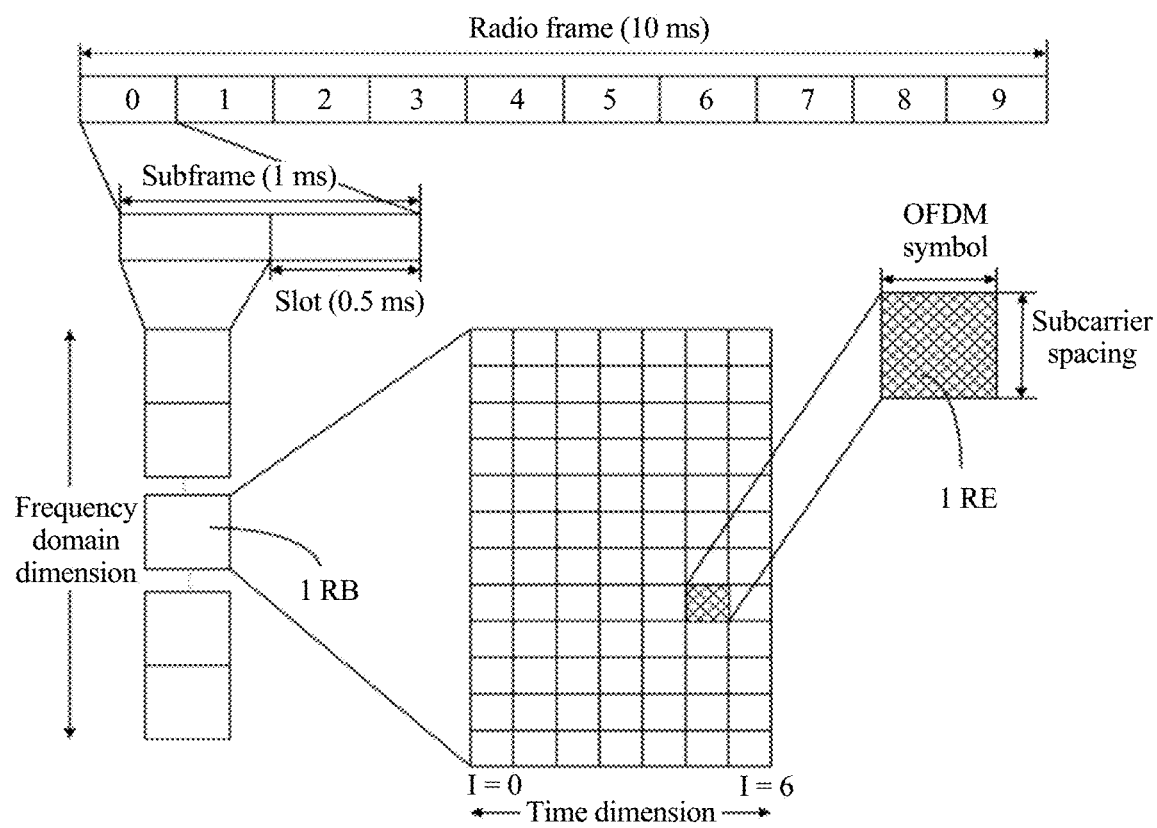
FIG. 3 is a schematic diagram of a correspondence of bandwidth resources in an LTE system.

FIG. 3 is a schematic diagram of a time-frequency correspondence of bandwidth resources in the LTE system. As shown in FIG. 3, one radio frame is 10 ms, including 10 subframes with subframe indexes of 0 to 9. Each subframe is 1 ms, and one subframe is divided into two slots (slot). In a normal cyclic prefix (Cyclic Prefix, CP) mode, each slot has 7 orthogonal frequency division multiplexing (Orthogonal Frequency Division Multiplexing, OFDM) symbols with symbol indexes I=0 to I=6. The system allocates resources by allocating resource blocks (Resource Block, RB), and different quantities of RBs are allocated for different bandwidths. Generally, 1 RB includes a time domain resource occupied by one slot in a time dimension, and usually includes a resource occupied by 12 subcarriers in a frequency dimension. A subcarrier spacing is 15 KHz, and a resource occupied by a subcarrier on an OFDM symbol is referred to as a resource element (Resource Element, RE).

Figures 4, 5:
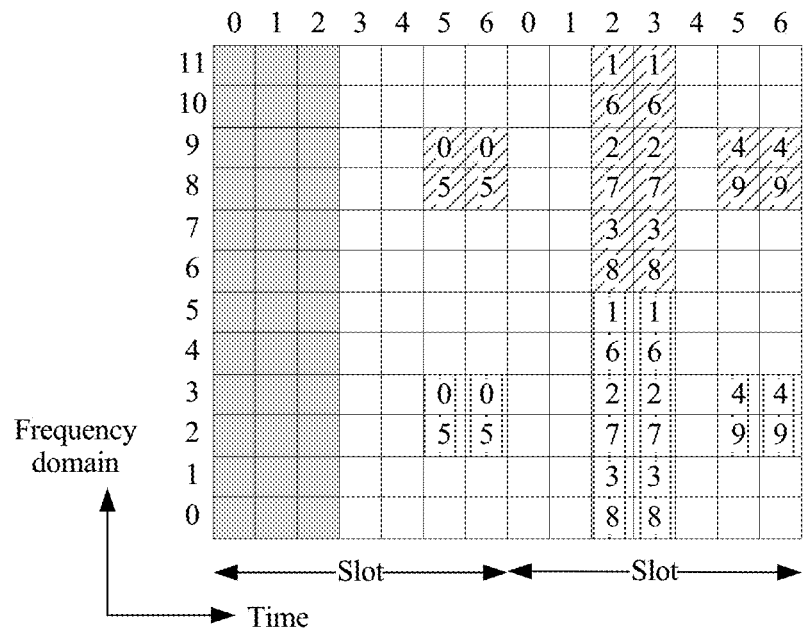
FIG. 4 is a schematic diagram of a time-frequency resource configuration of channel state information-reference signals of four ports.
FIG. 5 is a subframe configuration table of a channel state information-reference signal.

For example, the downlink reference signal may be a CSI-RS, referring to FIG. 3 and a schematic diagram of a time-frequency resource configuration of CSI-RSs of four ports shown in FIG. 4. FIG. 4 is a time-frequency resource diagram in the normal CP mode. As shown in FIG. 4, a time dimension is represented in a horizontal direction, and one subframe includes 14 symbols; a frequency dimension is represented in a vertical direction, 12 subcarriers. Three columns shown in a gray shadow area in FIG. 4 represent bandwidth resources allocated to the UE, and sections shown in slash areas or straight line areas represent time-frequency resources occupied for configuring the CSI-RSs.

FIG. 5 is a subframe configuration table of the CSI-RS, and may indicate the configuration information of the downlink reference signal with reference to FIG. 4.

If the downlink reference signal is the beam-based downlink reference signal, the downlink reference signal exists in a synchronization signal block, and the configuration information of the downlink reference signal may also exist in the synchronization signal block.

After completing configuration of the downlink reference signal, the network side device may send the configuration information of the downlink reference signal to the user equipment.

In a possible implementation, the network side device sends the configuration information of the downlink reference signal to the user equipment over a physical broadcast channel (Physical Broadcast Channel, PBCH). In this case, the network side device may send, over the PBCH, the configuration information of the downlink reference signal to all user equipments in coverage of the network side device or all user equipments in coverage of a base station to which the network side device belongs, to notify all the user equipments of the time-frequency resource location and port information of the downlink reference signal. The user equipment may be any one of all the user equipments in the coverage of the network side device, or any one of all the user equipments in the coverage of the base station to which the network side device belongs.

In a possible implementation, the network side device sends the configuration information of the downlink reference signal to the user equipment by using radio resource control (Radio Resource Control, RRC) signaling. The RRC signaling may be, for example, CSI-RS-Config IE. It may be understood that the configuration information of the downlink reference signal is carried in the RRC signaling. The network side device may pertinently send RRC signaling to user equipment in coverage of the network side device or user equipment in coverage of a base station to which the network side device belongs, or in other words, send different RRC signaling to different user equipments. It may be understood that the network side device configures different configuration information of the downlink reference signal in the RRC signaling for different user equipments. Similarly, the user equipment may be any one of all user equipments in the coverage of the network side device, or any one of all user equipments in the coverage of the base station to which the network side device belongs.

In a possible implementation, after configuring the downlink reference signal, the network side device does not immediately send the configuration information of the downlink reference signal to the user equipment, but sends the configuration information of the downlink reference signal to the user equipment when a location of the user equipment meets a specific condition. Optionally, when the location of the user equipment meets the specific condition, the network side device configures the downlink reference signal, and sends the configuration information of the downlink reference signal to the user equipment.

The network side device detects whether the user equipment is located in a preset edge area, and sends the configuration information of the downlink reference signal to the user equipment when the user equipment is located in the preset edge area. A method in which the network side device detects whether the user equipment is located in the preset edge area is not limited herein. For example, the network side device may determine, based on RSRP fed back by the user equipment based on a synchronization signal, whether the user equipment is located in the preset edge area, or determine, based on geographical location information of the user equipment, whether the user equipment is located in the preset edge area.

The preset edge area is an edge area of the coverage of the base station to which the network side device belongs, and a distance between the edge area and a center of the coverage of the base station exceeds a preset threshold. The preset threshold or a specific size of the preset edge area is set by the network side device and is not limited herein. The network side device may send the configuration information of the downlink reference signal to all user equipments located in the preset edge area. In this possible implementation, the network side device may send the configuration information of the downlink reference signal to the user equipment over the PBCH or by using the RRC signaling.

It may be understood that, when the user equipment is located in the preset edge area, low precision of measurement performed by the user equipment by using the CRS or the synchronization signal may result in a ping-pong handover effect. Therefore, in this embodiment of the present invention, the downlink reference signal is configured for measurement, so that measurement precision in the edge area can be improved.

Optionally, the network side device detects whether the user equipment is located in the preset edge area, and configures the downlink reference signal and sends the configuration information of the downlink reference signal to the user equipment when the user equipment is located in the preset edge area.

Optionally, the network side device sends the configuration information of the downlink reference signal to a neighboring network side device through an interface between the network side devices, to notify the neighboring network side device of content sent by the network side device to the user equipment.

In a possible implementation, when detecting that signal strength of the user equipment is less than a preset threshold, the network side device sends the configuration information of the downlink reference signal to the user equipment. It may be understood that, when the user equipment has a relatively poor signal, the network side device sends the configuration information of the downlink reference signal to the user equipment, so that the user equipment performs measurement based on the downlink reference signal, thereby improving measurement precision. A specific value of the preset threshold is set by the network side device and is not limited herein. The method in which the network side device detects the signal strength of the user equipment is not limited herein, either. Optionally, when detecting that another signal parameter of the user equipment is relatively small, the network side device sends the configuration information of the downlink reference signal to the user equipment.

A sending direction in which the network side device sends the configuration information of the downlink reference signal to the user equipment may be determined based on a sending direction of a sequence or information such as a random access channel (Random Access Channel, RACH) preamble (preamble) or a message 3 (Msg3) that is sent by the user equipment. The RACH and the Msg3 are uplink signals and may be used for random access by a user.

The sending direction in which the network side device sends the configuration information of the downlink reference signal to the user equipment may be determined based on a sending direction of a sounding reference signal (Sounding Reference Signal, SRS) sent by the user equipment. The SRS is an uplink reference signal and may be used for uplink channel quality measurement or data demodulation.

202. The user equipment receives the configuration information that is of the downlink reference signal and that is sent by the network side device.

Specifically, the user equipment receives, over the PBCH or by using the RRC signaling, the configuration information that is of the downlink reference signal and that is sent by the network side device, or the user equipment receives the configuration information of the downlink reference signal when the user equipment is located in the preset edge area.

When receiving the configuration information of the downlink reference signal, the user equipment determines the port information and the time-frequency resource information of the downlink reference signal based on the configuration information of the downlink reference signal, so as to receive the downlink reference signal.

203. The network side device sends the downlink reference signal to the user equipment, where the downlink reference signal is generated based on the configuration information of the downlink reference signal.

After obtaining the configuration information of the downlink reference signal, the network side device generates the downlink reference signal based on the configuration information of the downlink reference signal, and sends the downlink reference signal to the user equipment.

204. The user equipment receives the downlink reference signal sent by the network side device.

Specifically, the user equipment receives, based on the configuration information of the downlink reference signal, the downlink reference signal sent by the network side device.

205. The user equipment performs measurement based on the downlink reference signal.

When the user equipment is located in the preset edge area or the user equipment is located in any area, the user equipment may obtain a first measurement result through measurement based on the downlink reference signal. The first measurement result includes at least one of first RSRP, first RSRQ, or a first received signal strength indicator (Received Signal Strength Indicator, RSSI). RSRP is one of important bases of cell reselection and handover, and precision of the RSRP directly determines precision of cell reselection and handover, and further affects performance of an entire system. RSRQ: this measure is primarily used for sorting different LTE candidate cells based on signal quality, and this measure is used as an input of decision to perform cell handover and reselection. RSSI is an optional part of a wireless transmission layer, and is used to determine link quality and whether to increase broadcast transmission strength.

Optionally, the user equipment obtains a measurement value corresponding to the downlink reference signal, and obtains the first measurement result corresponding to the downlink reference signal through calculation based on the measurement value corresponding to the downlink reference signal. The user equipment may also obtain the first measurement result through measurement in another manner or according to another algorithm.

In this case, it may be considered that the first measurement result that is obtained through measurement based on the downlink reference signal has relatively high precision and can be used for precise calculation of UE in a connected mode. It should be noted that there is more than one downlink reference signal, and the first RSRP or the first RSRQ or the first RSSI may represent a measurement value of a downlink reference signal corresponding to one or more cells. The RSRP is used as an example. RSRP of a downlink reference signal corresponding to each cell may be a maximum value in RSRP values of a plurality of beams, or may be an average value of RSRP values of a plurality of beams, or may be N values of RSRP values of a plurality of beams. Second RSRP, third RSRP, and fourth RSRP below may be the same.

In this embodiment of the present invention, the network side device sends the configuration information of the downlink reference signal and the downlink reference signal to the user equipment, and the user equipment performs measurement based on the downlink reference signal, so that measurement can be performed based on the downlink reference signal, and a measurement signal can be configured as required, thereby improving measurement precision and measurement efficiency, and reducing downlink reference signal overheads.

It should be noted that step 206 to step 211 in the embodiment shown in FIG. 2 are optional steps.

206. The user equipment sends a first measurement result to the network side device.

Specifically, the user equipment feeds back the first measurement result to the network side device, so that the network side device determines, based on the first measurement result, whether the user equipment needs to perform cell handover.

Optionally, before feeding back the first measurement result, the user equipment may perform filtering on the first measurement result, so that the network side device can better determine whether the user equipment needs to perform cell handover or reselection. For example, layer 3 filtering is performed on the first measurement result. A formula of the layer 3 filtering may be Fn=(1−a)*Fm+a*Mn, where Mn is a value obtained through current measurement, Fm is a value obtained after previous filtering, Fn is a value obtained after current filtering, and a is a filter coefficient. RSRP is used as an example. If the first measurement result includes the first RSRP, the user equipment performs the layer 3 filtering on the first RSRP.

207. The network side device receives the first measurement result sent by the user equipment.

208. The network side device determines, based on the first measurement result, whether the user equipment needs to perform cell handover or reselection.

Specifically, when receiving the first measurement result, the network side device determines, based on the first measurement result, whether the user equipment needs to perform cell handover or reselection. If the user equipment is in a connected mode, the network side device determines whether the user equipment needs to perform cell handover; or if the user equipment is in an idle mode, the network side device determines whether the user equipment needs to perform cell reselection.

A method in which the network side device determines, based on the first measurement result, whether the user equipment needs to perform cell handover or reselection is not limited herein.

209. If a determining result is that the user equipment needs to perform cell handover or reselection, the network side device sends an instruction message to the user equipment.

The instruction message is used to instruct the user equipment to perform cell handover or reselection.

210. The user equipment receives the instruction message sent by the network side device.

211. The user equipment performs cell handover or reselection according to the instruction message.

The user equipment is handed over, to a target cell according to the instruction message, from a cell to which the network side device belongs, or reselects a target cell according to the instruction message.

For example, it is assumed that a cell in which a TRP 1 is located is a cell A, a cell in which a TRP 2 is located is a cell B, and UE is in a connected mode and is associated with the TRP 1. In this case, the TRP 1 sends configuration information of a CSI-RS to the UE, to measure the cell A and the cell B. The UE measures the CSI-RS on a time-frequency resource of the cell A based on the configuration information, to obtain a measurement result 1; measures the CSI-RS on a time-frequency resource of the cell B, to obtain a measurement result 2; and feeds back the measurement result 1 and the measurement result 2 to the TRP 1. If the measurement result 2 is better than the measurement result 1 (for example, a difference between the measurement result 2 and a preset value is greater than a difference between the measurement result 1 and the preset value), the TRP 1 sends an instruction message to the UE, and the instruction message is used to instruct the UE to be handed over from the cell A to the cell B. A value of the preset value is not limited herein and is set by the TRP 1.

It should be noted that an application scenario of Embodiment 1 shown in FIG. 2 includes: (1) the user equipment is located in the preset edge area; (2) the user equipment has a relatively poor signal; and (3) a location and signal quality of the user equipment are not limited.

Figure 6:
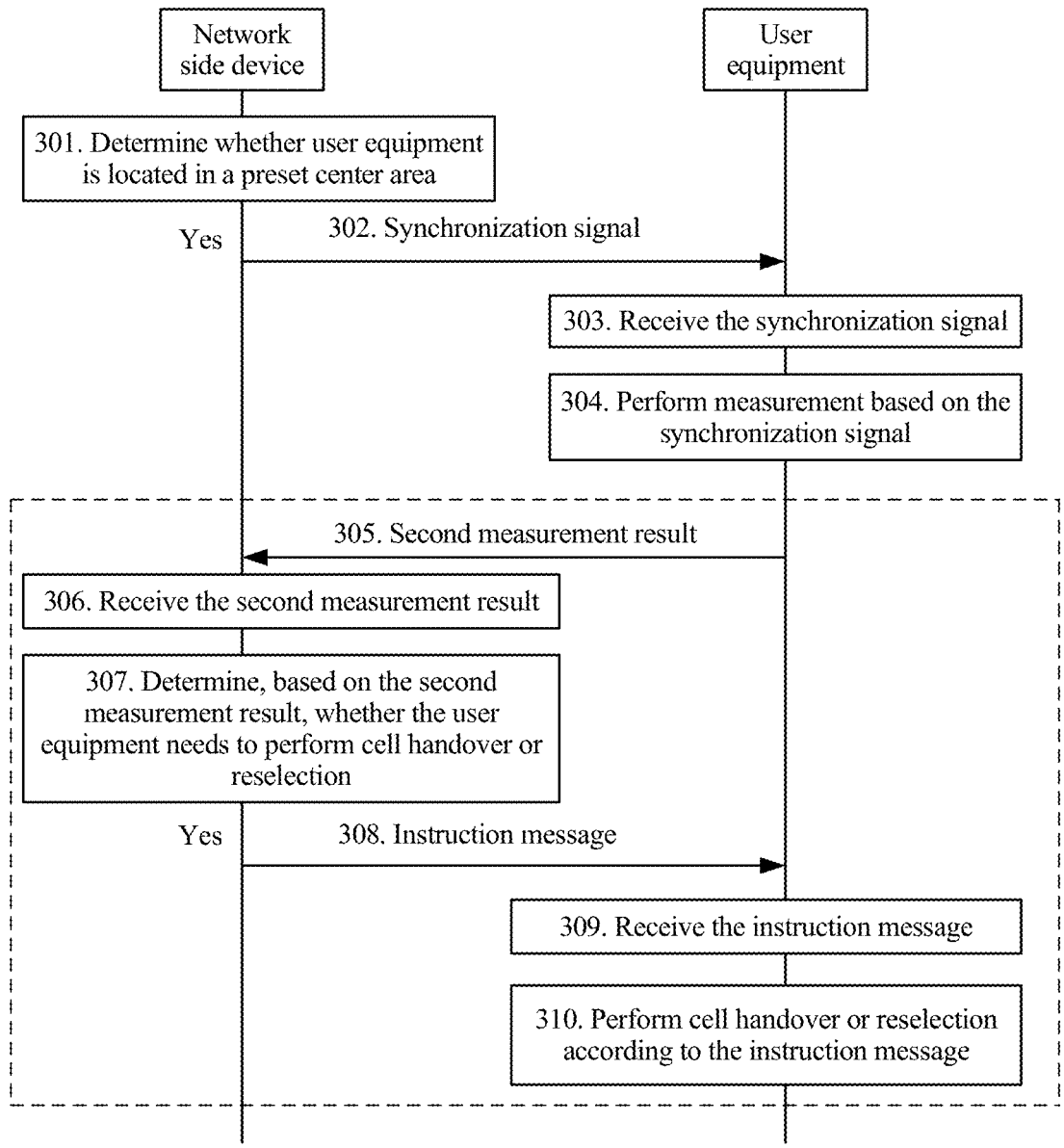
FIG. 6 is a schematic communication diagram of a signal measurement method according to Embodiment 2 of the present invention.

FIG. 6 is a schematic communication diagram of a signal measurement method according to Embodiment 2 of the present invention. The method includes step 301 to step 304. It should be noted that for a part that is of Embodiment 2 shown in FIG. 6 and that is the same as or similar to Embodiment 1 shown in FIG. 2, refer to the specific descriptions of Embodiment 1 shown in FIG. 2. Details are not described herein again.

301. A network side device determines whether user equipment is located in a preset center area.

Optionally, the network side device determines, based on a geographical location of the user equipment, whether the user equipment is located in the preset center area, or the network side device may determine, by using another method, whether the user equipment is located in the preset center area. A specific determining method is not limited herein.

The preset center area may be a center area in coverage of the network side device, or may be a center area in coverage of a base station to which the network side device belongs, and a size of the preset center area is not limited herein.

302. If a determining result is that the user equipment needs to perform cell handover or reselection, the network side device sends a synchronization signal to the user equipment.

When the user equipment is located in the preset center area, the network side device sends the synchronization signal to the user equipment. The synchronization signal includes a primary synchronization signal (Primary Synchronization Signal, PSS) and a secondary synchronization signal (Secondary Synchronization Signal, SSS).

The primary synchronization signal is mainly used to quickly determine a start position of a symbol/frame, namely, symbol timing synchronization, in a cell search process. The secondary synchronization signal is mainly used to assist the primary synchronization signal. The primary synchronization signal is located in resource elements of third OFDM symbols in subframes 1 and 6 in a frame. The secondary synchronization signal is located in subframes 0 and 5 in the frame. In this embodiment of the present invention, the primary synchronization signal and the secondary synchronization signal are used by the UE for measurement, but a measurement result has relatively low precision, and may be used for calculation of UE in an idle mode and rough calculation of UE in a connected mode.

303. The user equipment receives the synchronization signal sent by the network side device.

The user equipment receives the synchronization signal sent by the network side device, and when receiving the synchronization signal, may identify a cell identity, or if in an NR system, identify an NR cell identity.

304. The user equipment performs measurement based on the synchronization signal.

The user equipment obtains a second measurement result through measurement based on the synchronization signal. The second measurement result includes at least one of second RSRP, second RSRQ, or a second RSSI. The method in which the user equipment obtains the second measurement result through measurement and calculation may be the same as or may be different from the method for obtaining the first measurement result through measurement and calculation in the embodiment shown in FIG. 2. This is determined based on a specific situation.

In this case, it may be considered that the second measurement result that is obtained through measurement based on the synchronization signal has relatively low precision, and may be used for calculation of UE in an idle (idle) mode or rough calculation of UE in a connected mode.

In this embodiment of the present invention, when the user equipment is located in the preset center area, the network side device sends the synchronization signal to the user equipment, and the user equipment performs measurement based on the synchronization signal sent by the network side device.

It should be noted that step 305 to step 310 in the embodiment shown in FIG. 6 are optional steps.

305. The user equipment sends a second measurement result to the network side device.

Similarly, before sending the second measurement result to the network side device, the user equipment may perform filtering on the second measurement result, so that the network side device can better determine whether the user equipment needs to perform cell handover or reselection. For example, if the second measurement result includes the second RSRP, the user equipment performs layer 3 filtering on the second RSRP.

306. The network side device receives the second measurement result sent by the user equipment.

307. The network side device determines, based on the second measurement result, whether the user equipment needs to perform cell handover or reselection.

If the user equipment is in an idle mode, the network side device determines, based on the second measurement result, whether the user equipment needs to perform cell reselection; or if the user equipment is in a connected mode, the network side device determines, based on the second measurement result, whether the user equipment needs to perform cell handover.

308. If a determining result is that the user equipment needs to perform cell handover or reselection, the network side device sends an instruction message to the user equipment.

309. The user equipment receives the instruction message sent by the network side device.

310. The user equipment performs cell handover or reselection according to the instruction message.

It should be noted that the network side device may send the synchronization signal when the user equipment is located in any area, but when the user equipment is located in a preset edge area, measurement based on the synchronization signal has low precision, and may result in a ping-pong handover effect.

Based on Embodiment 1 shown in FIG. 2 and Embodiment 2 shown in FIG. 6, if the user equipment is located in the preset center area, the network side device sends the synchronization signal to the user equipment, and the user equipment may perform measurement based on the synchronization signal sent by the network side device; and if the user equipment is located in the preset edge area, the network side device sends configuration information of a downlink reference signal to the user equipment, and the user equipment performs measurement based on the downlink reference signal.

If the user equipment moves from the preset center area to the preset edge area, a measurement manner is changed, and measurement is performed based on the downlink reference signal configured by the network side device. For example, when the user equipment moves from a center area of a TRP to an edge area of the TRP, the TRP instructs, by using the configuration information of the downlink reference signal, the user equipment to perform measurement based on the downlink reference signal, and the user equipment may change a measurement manner that is based on the synchronization signal to a measurement manner that is based on the downlink reference signal.

When the user equipment is located in the preset center area, the user equipment feeds back the second measurement result, and when the user equipment is located in the preset edge area, the user equipment feeds back a first measurement result.

When the network side device sends both the downlink reference signal and the synchronization signal, the user equipment may obtain the first measurement result through measurement based on the downlink reference signal, and obtain the second measurement result through measurement based on the synchronization signal.

In a possible implementation, the user equipment obtains a third measurement result through calculation based on the first measurement result and the second measurement result, and sends the third measurement result to the network side device, and the network side device determines, based on the third measurement result, whether the user equipment needs to perform cell handover or reselection. RSRP is used as an example. The user equipment obtains third RSRP through calculation based on the first RSRP and the second RSRP. A calculation formula may be $RSRP\_ave = m*RSRP\_coarse + n*RSRP\_fine$, where RSRP_ave is the third RSRP, RSRP_coarse is the second RSRP with lower precision, RSRP_fine is the first RSRP with higher precision, and m and n are average coefficients. Specific values of m and n are not limited herein, and are set by the user equipment. Similarly, the user equipment may perform filtering on the third measurement result before sending the third measurement result.

In a possible implementation, the user equipment sends the first measurement result and the second measurement result to the network side device, and the network side device determines, based on the first measurement result and the second measurement result, whether the user equipment needs to perform cell handover or reselection. The network side device may calculate the first measurement result and the second measurement result according to the foregoing calculation formula. Similarly, before sending the first measurement result and the second measurement result, the user equipment may perform filtering on the first measurement result and the second measurement result.

Figure 7A:
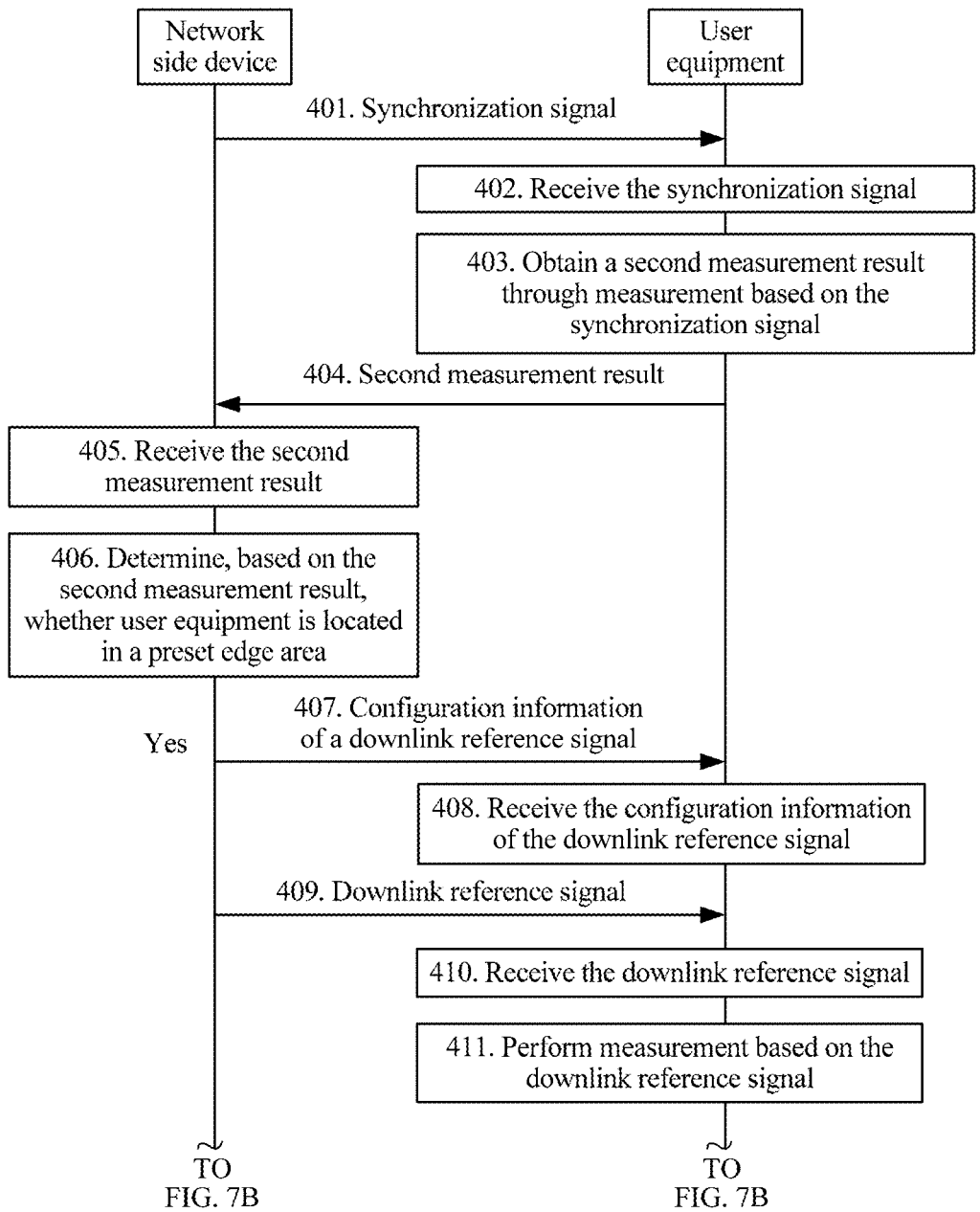
FIG. 7A and FIG. 7B are a schematic communication diagram of a signal measurement method according to Embodiment 3 of the present invention.
Figure 7B:
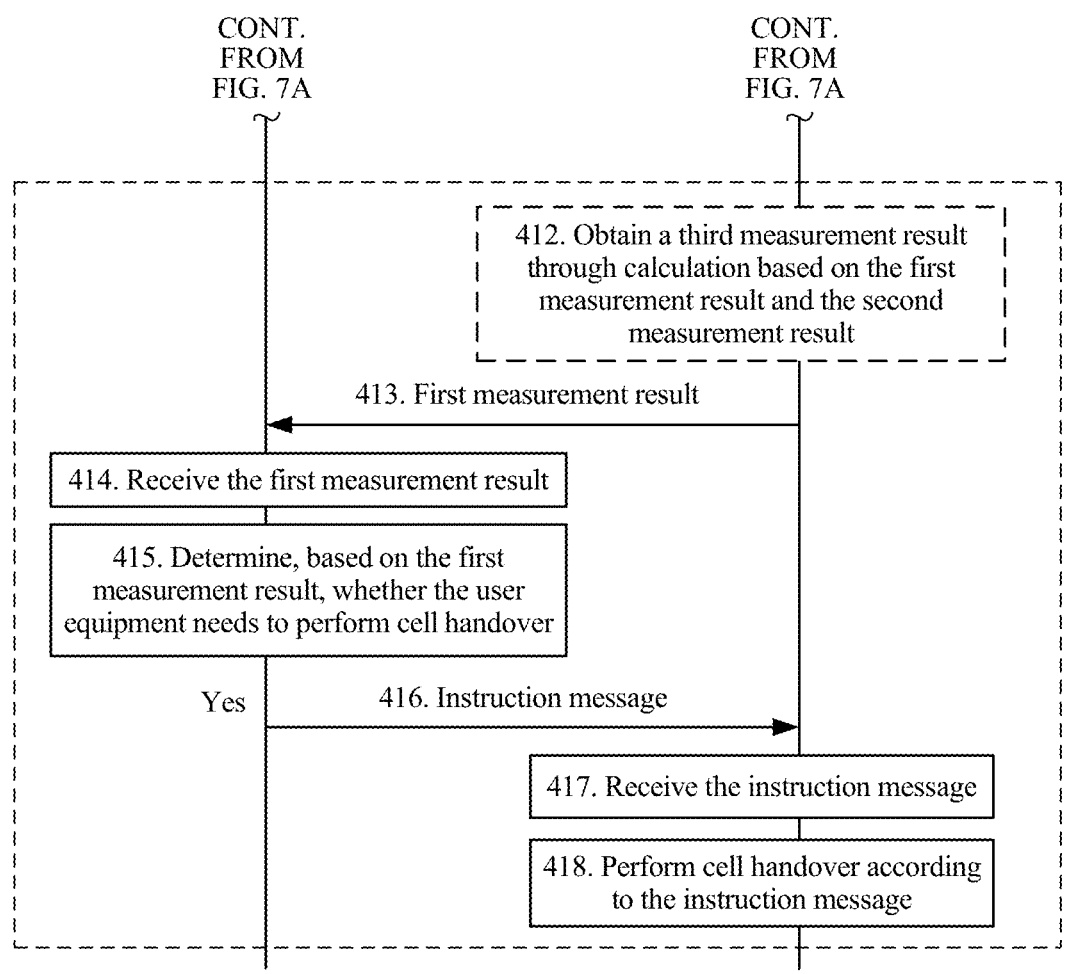

FIG. 7A and FIG. 7B are a schematic communication diagram of a signal measurement method according to Embodiment 3 of the present invention. The method includes step 401 to step 411. It should be noted that for a part that is of Embodiment 3 shown in FIG. 7A and FIG. 7B and that is the same as or similar to Embodiment 1 shown in FIG. 2, refer to the specific descriptions of Embodiment 1 shown in FIG. 2. Details are not described herein again.

401. A network side device sends a synchronization signal to user equipment.

402. The user equipment receives the synchronization signal sent by the network side device.

403. The user equipment obtains a second measurement result through measurement based on the synchronization signal.

404. The user equipment sends the second measurement result to the network side device.

405. The network side device receives the second measurement result sent by the user equipment.

406. The network side device determines, based on the second measurement result, whether the user equipment is located in a preset edge area.

407. If a determining result is that the user equipment needs to perform cell handover or reselection, the network side device sends configuration information of a downlink reference signal to the user equipment by using RRC signaling.

408. The user equipment receives the configuration information that is of the downlink reference signal and that is sent by the network side device.

409. The network side device sends the downlink reference signal to the user equipment.

410. The user equipment receives the downlink reference signal sent by the network side device.

411. The user equipment performs measurement based on the downlink reference signal.

The user equipment obtains a first measurement result through measurement based on the downlink reference signal.

It should be noted that step 412 to step 418 in the embodiment shown in FIG. 7A and FIG. 7B are optional steps.

412. The user equipment obtains a third measurement result through calculation based on a first measurement result and the second measurement result.

It should be noted that step 412 is an optional step.

413. The user equipment sends the first measurement result to the network side device.

If step 412 exists, the user equipment may feed back the third measurement result to the network side device.

414. The network side device receives the first measurement result.

If step 412 exists, the network side device receives the third measurement result.

415. The network side device determines, based on the first measurement result, whether the user equipment needs to perform cell handover.

If step 412 exists, the network side device determines, based on the third measurement result, whether the user equipment needs to perform cell handover.

416. If a determining result is that the user equipment needs to perform cell handover or reselection, the network side device sends an instruction message to the user equipment.

417. The user equipment receives the instruction message sent by the network side device.

418. The user equipment performs cell handover according to the instruction message.

For example, it is assumed that a cell in which a TRP 1 is located is a cell A, a cell in which a TRP 2 is located is a cell B, UE is in a connected mode and is associated with the TRP 1. The TRP 1 sends configuration information 1 of a downlink reference signal to the UE to measure the cell A. The UE obtains a measurement result 1 through measurement based on the configuration information 1 or a synchronization signal obtained by default, and feeds back the measurement result 1 to the TRP 1. If the TRP 1 determines, based on the measurement result 1, that the UE moves to a preset edge area of the TRP 1, the TRP 1 sends configuration information 2 of the downlink reference signal to the UE. The configuration information 2 includes configuration information of a CSI-RS of the cell A and configuration information of a CSI-RS of the cell B. The UE obtains downlink reference signals of the cell A and the cell B based on the configuration information 2, obtains, through measurement, a measurement result 2 of the cell A and a measurement result 3 of the cell B, and feeds back the measurement results 2 and 3 to the TRP 1. If the measurement result 3 is better than the measurement result 2 (for example, a difference between the measurement result 3 and a preset value is greater than a difference between the measurement result 2 and the preset value), the TRP 1 sends an instruction message to the UE, and the instruction message is used to instruct the UE to be handed over from the cell A to the cell B. A value of the preset value is not limited herein and is set by the TRP 1. In this embodiment of the present invention, when determining that the user equipment is located in the preset edge area, the network side device sends the configuration information of the downlink reference signal to the user equipment. When the user equipment is located in the preset edge area, the user equipment measures a signal based on the downlink reference signal, so that a measurement result fed back in the edge area is relatively precise, and downlink reference signal overheads can also be reduced.

Figure 8:
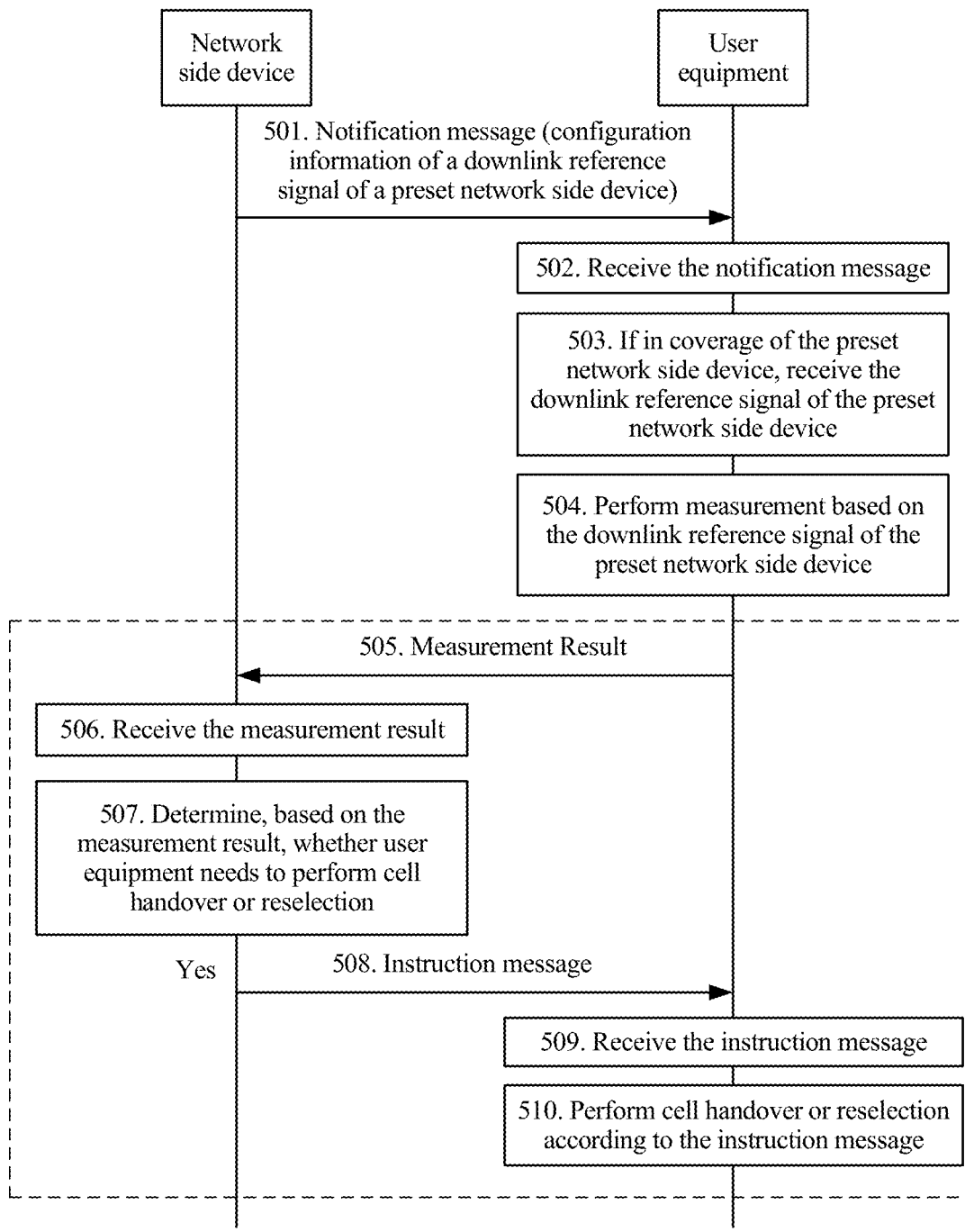
FIG. 8 is a schematic communication diagram of a signal measurement method according to Embodiment 4 of the present invention.

FIG. 8 is a schematic communication diagram of a signal measurement method according to Embodiment 4 of the present invention. The method includes step 501 to step 504. It should be noted that for a part that is of Embodiment 4 shown in FIG. 8 and that is the same as or similar to Embodiment 1 shown in FIG. 2, refer to the specific descriptions of Embodiment 1 shown in FIG. 2. Details are not described herein again.

501. A network side device sends a notification message to user equipment, where the notification message includes configuration information of a downlink reference signal of a preset network side device.

The preset network side device is an edge TRP, namely, one or more TRP that is set in an edge area of coverage of a base station to which the network side device belongs. A quantity of preset network side devices and an edge location are determined based on a specific situation, and are not limited herein. A location of the network side device in the coverage of the base station to which the network side device belongs is not limited. For example, the network side device is a TRP 1, and the preset network side device is a TRP 2 in the edge area.

The notification message includes the configuration information of the downlink reference signal of the preset network side device. For description of the configuration information of the downlink reference signal, refer to description in Embodiment 1 shown in FIG. 2, and details are not described herein again. The notification message is used to notify the user equipment that the preset network side device is to send the downlink reference signal, and notify, by using the configuration information of the downlink reference signal of the preset network side device, the user equipment of a time-frequency resource occupied by the downlink reference signal of the preset network side device, so that the user equipment obtains the downlink reference signal of the preset network side device.

The network side device sends the notification message to the user equipment by using a PBCH. The network side device may send the notification message to all user equipments in coverage of the network side device, or may send the notification message to all user equipments in the coverage of the base station to which the network side device belongs.

502. The user equipment receives the notification message sent by the network side device.

503. If in coverage of the preset network side device, the user equipment receives the downlink reference signal of the preset network side device.

504. The user equipment performs measurement based on the downlink reference signal of the preset network side device.

Because the user equipment may be in a moving state, the user equipment may move to the coverage of the preset network side device. In this case, the user equipment receives the downlink reference signal of the preset network side device, and performs measurement based on the downlink reference signal of the preset network side device when receiving the downlink reference signal of the preset network side device.

A difference from Embodiment 1 shown in FIG. 2 is that the user equipment does not perform measurement based on a downlink reference signal of the network side device, but performs measurement based on the downlink reference signal of the preset network side device, so that the user equipment can flexibly measure a signal during moving.

It should be noted that step 505 to step 510 in Embodiment 4 shown in FIG. 8 are optional steps.

505. The user equipment sends a measurement result to the network side device.

The measurement result includes a fourth measurement result obtained by the user equipment through measurement based on the downlink reference signal of the preset network side device.

If the network side device sends synchronization information to the user equipment, the measurement result includes the second measurement result in Embodiment 1 shown in FIG. 6, or includes the second measurement result and the fourth measurement result, or includes a fifth measurement result obtained by the user equipment through calculation based on the second measurement result and the fourth measurement result.

506. The network side device receives the measurement result fed back by the user equipment.

507. The network side device determines, based on the measurement result, whether the user equipment needs to perform cell handover or reselection.

For example, it is assumed that the network side device is a TRP 1, the preset network side device is a TRP 2 in an edge area, a cell in which the TRP 1 is located is a cell A, and a cell in which the TRP 2 is located is a cell B. The TRP 1 sends a notification message to UE, and the notification message includes configuration information of a downlink reference signal of the TRP 2. If the UE moves to the TRP 2, the UE obtains the downlink reference signal of the TRP 2 based on the configuration information, obtains a measurement result through measurement, and feeds back the measurement result to the TRP 1. The measurement result includes a measurement result for the cell B and a measurement result for a neighboring cell of the cell B. The TRP 2 determines, based on the measurement result for the cell B and the measurement result for the neighboring cell of the cell B, whether the UE performs cell handover.

508. If a determining result is that the user equipment needs to perform cell handover or reselection, the network side device sends an instruction message to the user equipment.

509. The user equipment receives the instruction message sent by the network side device.

510. The user equipment performs cell handover or reselection according to the instruction message.

In this embodiment of the present invention, the network side device notifies the user equipment of the configuration information of the downlink reference signal of the edge network side device by using the notification message, so that the user equipment performs measurement based on the downlink reference signal of the edge network side device and feeds back the measurement result. In this way, the user equipment can flexibly measure a signal, downlink reference signal overheads can also be reduced, and measurement precision and measurement efficiency can be improved.

In Embodiment 3 shown in FIG. 7A and FIG. 7B, the network side device detects whether the user equipment is located in the preset edge area, and sends the configuration information of the downlink reference signal to the user equipment when the user equipment is located in the preset edge area, so as to instruct the user equipment to perform measurement based on the downlink reference signal. In Embodiment 4 shown in FIG. 8, the network side device notifies the user equipment of the configuration information of the downlink reference signal of the edge network side device, and the user equipment performs measurement based on the downlink reference signal of the edge network side device when the user equipment is located in the coverage of the edge network side device. Although implementations of the two embodiments are different, beneficial effects are the same.

To reduce dependence of radio resource management on fixed downlink reference signals frequently sent in a network, and to improve system efficiency, manufacturers consider introducing a measurement method that is based on an uplink signal. To be specific, UE sends an uplink signal, and an NR cell/TRP that is associated with the UE and a neighboring cell measure the uplink signal sent by the UE, and compare and determine measurement results of the cells, to determine that the UE is to be handed over to a proper cell for serving. Use of uplink measurement enables the network to track a user, so that the network can not only track a current location of the user but also learn of a TRP that can provide currently best transmission. Use of uplink measurement can further implement quick access of the user, reduce a sending range of a downlink paging (paging) message and paging signaling overheads, and improve network performance.

However, in a high-frequency NR system, an uplink measurement signal may need to be transmitted by using a directional beam. Because there may be a relatively long time interval between beam transmission of two consecutive uplink signals, for example, several milliseconds or dozens of milliseconds, relatively large latency is generated when a TRP receives a correct beam.

Figure 9A:
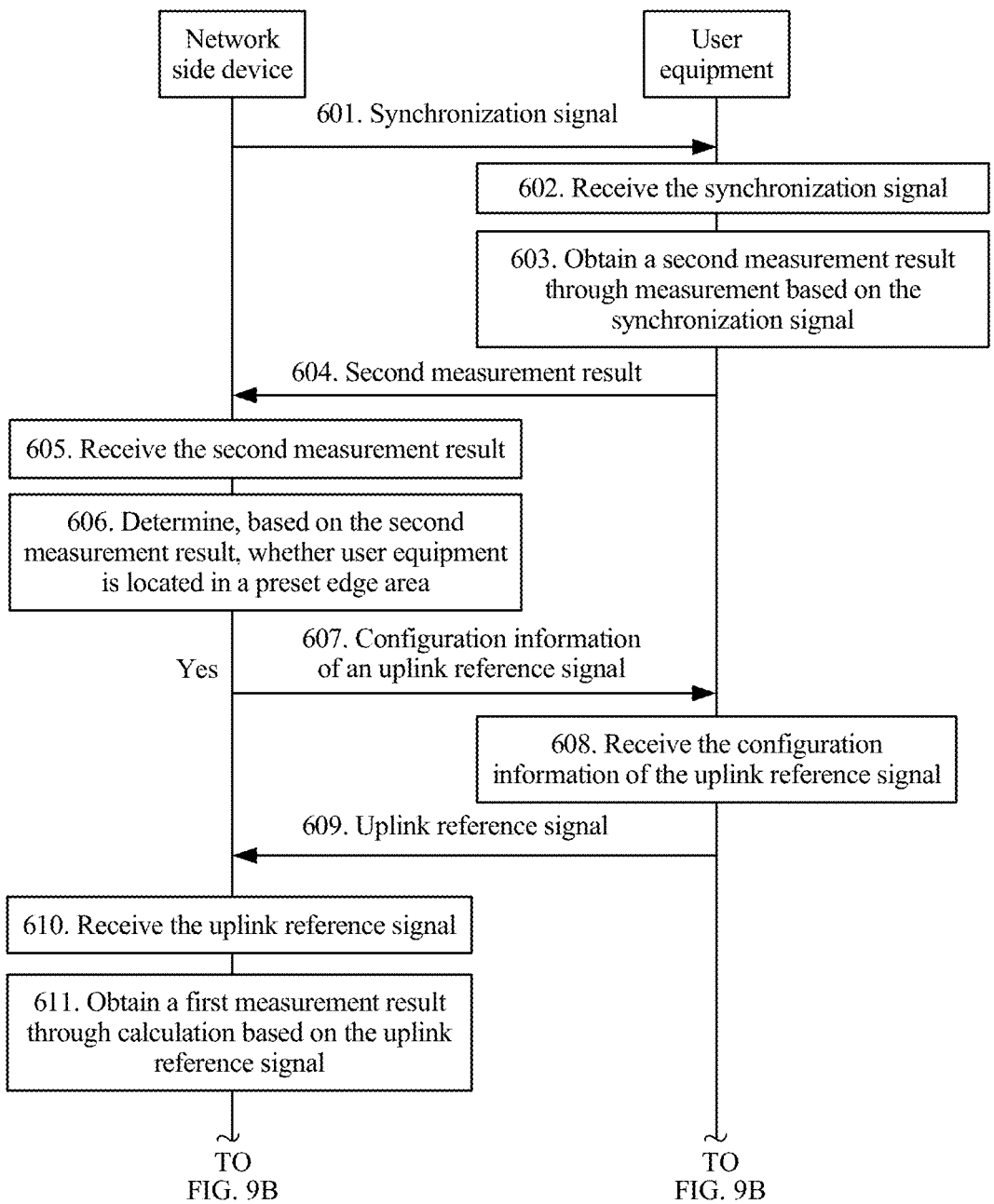
FIG. 9A and FIG. 9B are a schematic communication diagram of a signal measurement method according to Embodiment 5 of the present invention.
Figure 9B:
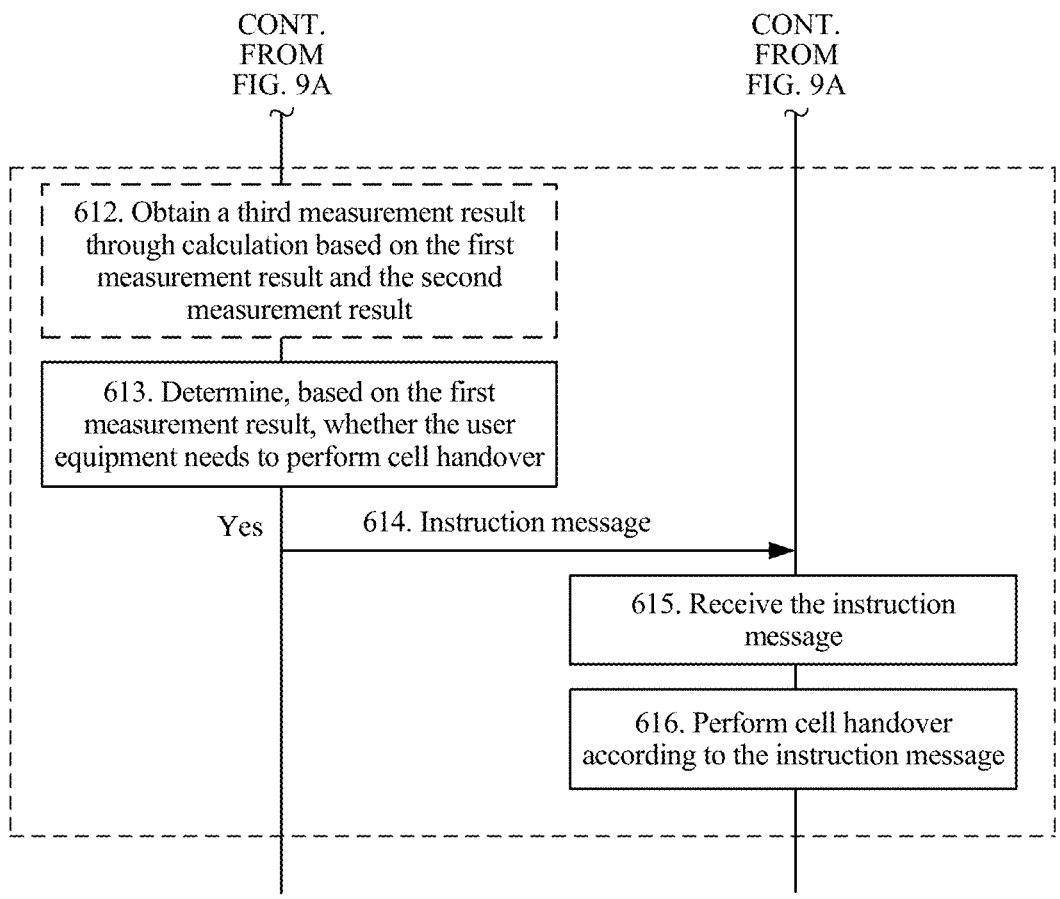

In view of this, according to the measurement method that is based on an uplink signal provided in Embodiment 5 of the present invention, latency can be reduced and power can be saved. FIG. 9A and FIG. 9B are a schematic communication diagram of a measurement method based on an uplink signal according to Embodiment 5 of the present invention. The method includes step 601 to step 611. It should be noted that for a part that is of Embodiment 5 shown in FIG. 9A and FIG. 9B and that is the same as or similar to Embodiment 1 shown in FIG. 2, refer to the specific descriptions of Embodiment 1 shown in FIG. 2. Details are not described herein again.

601. a network side device sends a synchronization signal to user equipment.

602. The user equipment receives the synchronization signal sent by the network side device.

603. The user equipment obtains a second measurement result through measurement based on the synchronization signal.

604. The user equipment sends the second measurement result to the network side device.

605. The network side device receives the second measurement result sent by the user equipment.

606. The network side device determines, based on the second measurement result, whether the user equipment is located in a preset edge area.

607. If a determining result is that the user equipment needs to perform cell handover or reselection, the network side device sends configuration information of an uplink reference signal to the user equipment by using RRC signaling.

The uplink reference signal may be an SRS.

608. The user equipment receives the configuration information that is of the uplink reference signal and that is sent by the network side device.

609. The user equipment sends the uplink reference signal to the network side device based on the configuration information of the uplink reference signal.

The user equipment obtains, based on the configuration information of the uplink reference signal, a time-frequency resource that is allocated by the network side device to the user equipment and used for sending the uplink reference signal, and sends the uplink reference signal to the network side device by using the time-frequency resource.

610. The network side device receives the uplink reference signal sent by the user equipment.

611. The network side device obtains a first measurement result through calculation based on the uplink reference signal.

A specific method in which the network side device obtains the first measurement result through calculation based on the uplink reference signal is not limited herein.

It should be noted that step 612 to step 616 in Embodiment 5 shown in FIG. 9A and FIG. 9B are optional steps.

612. The network side device obtains a third measurement result through calculation based on the first measurement result and the second measurement result.

It should be noted that step 612 is an optional step.

613. The network side device determines, based on the first measurement result, whether the user equipment needs to perform cell handover.

If step 612 exists, the network side device may determine, based on the third measurement result, whether the user equipment needs to perform cell handover.

614. If a determining result is that the user equipment needs to perform cell handover or reselection, the network side device sends an instruction message to the user equipment.

615. The user equipment receives the instruction message sent by the network side device.

616. The user equipment performs cell handover according to the instruction message.

In this embodiment of the present invention, when the user equipment is located in the preset edge area, the network side device sends the configuration information of the uplink reference signal to the user equipment, and the user equipment sends the uplink reference signal to the network side device based on the configuration information of the uplink reference signal. The network side device performs calculation based on the uplink reference signal sent by the user equipment, so as to perform radio resource management, implement uplink reference signal-based measurement, and reduce latency and save power.

Figure 10:
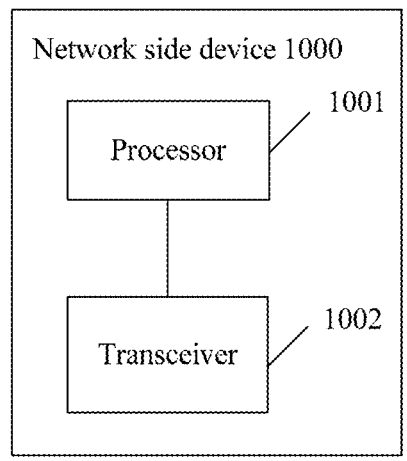
FIG. 10 is a schematic structural diagram of a network side device according to an embodiment of the present invention.

FIG. 10 is a schematic structural diagram of a network side device according to an embodiment of the present invention. As shown in FIG. 10, the network side device 1000 includes a processor 1001 and a transceiver 1002. The transceiver 1002 may also be implemented by a transceiver unit or a transceiver circuit, and the processor 1001 may be implemented by one or more units or circuits.

It should be understood that the network side device 1000 may be corresponding to the network side device in the method embodiments, and may have any function of the network side device in the method. Only some functions are used as an example for description in the following, but this embodiment is not limited thereto.

The transceiver 1002 is configured to send configuration information of a downlink reference signal, where the configuration information of the downlink reference signal is used to indicate air interface sending information of the downlink reference signal.

The transceiver 1002 is further configured to send the downlink reference signal, where the downlink reference signal is generated based on the configuration information of the downlink reference signal.

Optionally, the configuration information of the downlink reference signal includes port information of the downlink reference signal and time-frequency resource information of the downlink reference signal.

Optionally, the transceiver 1002 is specifically configured to: send the configuration information of the downlink reference signal over a physical broadcast channel PBCH, or send the configuration information of the downlink reference signal by using radio resource control RRC signaling.

Optionally, the downlink reference signal is a configurable downlink reference signal, and includes a channel state information-reference signal or a downlink measurement reference signal; or the downlink reference signal is a beam-based downlink reference signal, and includes a beam-specific reference signal or a cell-specific reference signal.

Optionally, the transceiver 1002 is specifically configured to send the configuration information of the downlink reference signal when it is detected that user equipment is located in a preset edge area.

Optionally, the transceiver 1002 is further configured to receive a first measurement result sent by the user equipment, where the first measurement result is obtained by the user equipment through measurement based on the downlink reference signal, and includes at least one of first reference signal received power RSRP, first reference signal received quality RSRQ, or a first received signal strength indicator RSSI.

Optionally, the transceiver 1002 is further configured to receive a second measurement result sent by the user equipment, where the second measurement result is obtained by the user equipment through measurement based on a synchronization signal sent by the network side device, and includes at least one of second RSRP, second RSRQ, or a second RSSI.

Optionally, the transceiver 1002 is further configured to receive a third measurement result sent by the user equipment, where the third measurement result is obtained by the user equipment through calculation based on the first measurement result and the second measurement result, and includes at least one of third RSRP, third RSRQ, or a third RSSI.

Optionally, the transceiver 1002 is further configured to receive the first measurement result and the second measurement result that are sent by the user equipment, where the first measurement result is obtained through measurement based on the downlink reference signal when the user equipment is located in the preset edge area, and the second measurement result is obtained through measurement based on the synchronization signal when the user equipment is located in a preset center area.

Optionally, the transceiver 1002 is further configured to determine, based on a measurement result sent by the user equipment, whether the user equipment needs to perform cell handover or reselection, where the measurement result includes the first measurement result, or the second measurement result, or the third measurement result, or the first measurement result and the second measurement result.

If a determining result is that the user equipment needs to perform cell handover or reselection, the network side device sends an instruction message to the user equipment, where the instruction message is used to instruct the user equipment to perform cell handover or reselection.

Figure 11:
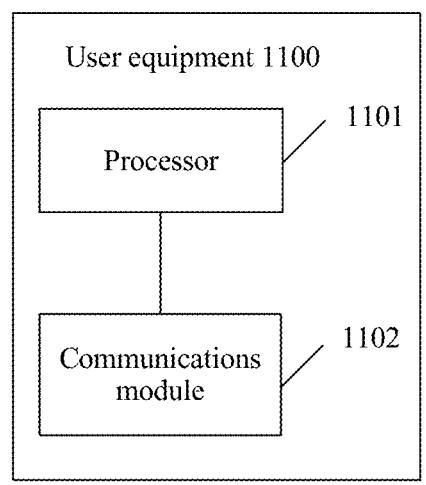
FIG. 11 is a schematic structural diagram of user equipment according to an embodiment of the present invention.

FIG. 11 is a schematic structural diagram of user equipment according to an embodiment of the present invention. As shown in FIG. 11, the user equipment 1100 includes a processor 1101 and a communications module 1102. The communications module 1102 may also be implemented by a transceiver unit or a transceiver circuit, and the processor 1101 may be implemented by one or more units or circuits.

The communications module 1102 is configured to receive configuration information of a downlink reference signal, where the configuration information of the downlink reference signal is used to indicate air interface sending information of the downlink reference signal.

The communications module 1102 is further configured to receive the downlink reference signal, where the downlink reference information is generated based on the configuration information of the downlink reference signal.

The processor 1101 is configured to perform measurement based on the downlink reference signal.

Optionally, the configuration information of the downlink reference signal includes port information of the downlink reference signal and time-frequency resource information of the downlink reference signal.

Optionally, the configuration information of the downlink reference signal is sent to the user equipment over a PBCH or sent to the user equipment by using RRC signaling.

Optionally, the downlink reference signal is a configurable downlink reference signal, and includes a channel state information-reference signal or a downlink measurement reference signal; or the downlink reference signal is a beam-based downlink reference signal, and includes a beam-specific reference signal or a cell-specific reference signal.

Optionally, the configuration information of the downlink reference signal is sent by the network side device to the user equipment when the network side device detects that the user equipment is located in a preset edge area.

Optionally, the communications module 1102 is further configured to send a first measurement result, where the first measurement result is obtained by the user equipment through measurement based on the downlink reference signal, and includes at least one of first RSRP, first RSRQ, or a first RSSI.

Optionally, the processor 1101 is further configured to obtain a second measurement result through measurement based on a synchronization signal, where the second measurement result includes at least one of second RSRP, second RSRQ, or a second RSSI; and the communications module 1102 is further configured to send the second measurement result.

Optionally, the processor 1101 is further configured to obtain a third measurement result through calculation based on the first measurement result and the second measurement result, where the measurement result includes the third measurement result, and the third measurement result includes at least one of third RSRP, third RSRQ, or a third RSSI; and the communications module 1102 is further configured to send the third measurement result.

Optionally, the processor 1101 is further configured to obtain the first measurement result through measurement based on the downlink reference signal when the user equipment is located in the preset edge area;

the processor 1101 is further configured to obtain the second measurement result through measurement based on the synchronization signal when the user equipment is located in a preset center area; and the communications module 1102 is further configured to send the first measurement result and the second measurement result.

Optionally, the communications module 1102 is further configured to receive an instruction message, and perform cell handover or reselection according to the instruction message.

Optionally, each of the network side device 1000 and the user equipment 1100 may further include a memory. The memory may store program code and other stored content, and the processor invokes the program code and other stored content stored in the memory to implement corresponding functions of the network side device 1000 and the user equipment 1100.

An implementation of this application further includes a communications system, including the network side device in the foregoing network side device embodiment and the user equipment in the user equipment embodiment.

In the implementation of this application, the apparatus may be a field-programmable gate array (Field-Programmable Gate Array, FPGA), may be an application-specific integrated circuit (Application Specific Integrated Circuit, ASIC), may be a system on chip (System on Chip, SoC), may be a central processing unit (Central Processor Unit, CPU), may be a network processor (Network Processor, NP), may be a digital signal processing circuit (Digital Signal Processor, DSP), may be a micro controller unit (Micro Controller Unit, MCU), or may be a programmable controller (Programmable Logic Device, PLD) or another integrated chip.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again. For ease of brevity, each method embodiment may also be used as mutual reference, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal measurement method, comprising:
    receiving, by user equipment, a channel state information-reference signal (CSI-RS);
    receiving, by the user equipment, a synchronization signal; and
    sending, by the user equipment, a third measurement result which is calculated based on a first measurement result and a second measurement result, wherein the first measurement result is obtained through measurement based on the CSI-RS in downlink when the user equipment is located in a preset edge area, and the second measurement result is obtained through measurement based on the synchronization signal when the user equipment is located in a preset center area.

2. The method according to claim 1, wherein a configuration information of the CSI-RS is sent to the user equipment by using Radio Resource Control (RRC) signaling.

3. The method according to claim 1, wherein the first measurement result comprises at least one of a first Reference Signal Received Power (RSRP), a first Reference Signal Received Quality (RSRQ), or a first Received Signal Strength Indicator (RSSI).

4. The method according to claim 1, wherein the second measurement result comprises at least one of a second RSRP, a second RSRQ, or a second RSSI.

5. The method according to claim 1, wherein the method further comprises:
    receiving, by the user equipment, an instruction message, wherein the instruction message indicates performing a cell handover or reselection.

6. The method according to claim 1, wherein the first measurement result and the second measurement result are used for Radio Resource Management (RRM).

7. The method according to claim 1, wherein the method further comprises:
    obtaining, by the user equipment, the third measurement result through calculation based on the first measurement result and the second measurement result, the third measurement result comprises at least one of third RSRP, third RSRQ, or a third RSSI.

8. User equipment, comprising:
    at least one processor;
    a non-transitory computer-readable storage medium coupled to the at least one processor and storing programming instructions for execution by the at least one processor; and
    a transceiver, wherein the transceiver is configured to:
        receive a channel state information-reference signal (CSI-RS);
        receive a synchronization signal; and
        send a third measurement result which is calculated based on a first measurement result and a second measurement result, wherein the first measurement result is obtained through measurement based on the CSI-RS in downlink when the user equipment is located in a preset edge area, and the second measurement result is obtained through measurement based on the synchronization signal when the user equipment is located in a preset center area.

9. The user equipment according to claim 8, wherein a configuration information of the CSI-RS is sent to the user equipment by using Radio Resource Control (RRC) signaling.

10. The user equipment according to claim 8, wherein the first measurement result comprises at least one of a first Reference Signal Received Power (RSRP), a first Reference Signal Received Quality (RSRQ), or a first Received Signal Strength Indicator (RSSI).

11. The user equipment according to claim 8, wherein the second measurement result comprises at least one of a second RSRP, a second RSRQ, or a second RSSI.

12. The user equipment according to claim 8, wherein the transceiver is configured to receive an instruction message, wherein the instruction message indicates performing a cell handover or reselection.

13. The user equipment according to claim 8, wherein the first measurement result and the second measurement result are used for Radio Resource Management (RRM).

14. The user equipment according to claim 8, wherein:
   the programming instructions instruct the at least one processor to obtain the third measurement result through calculation based on the first measurement result and the second measurement result, the third measurement result comprises at least one of third RSRP, third RSRQ, or a third RSSI.

\* \* \* \* \*